(12) United States Patent
Kishigami

(10) Patent No.: US 10,024,958 B2
(45) Date of Patent: Jul. 17, 2018

(54) RADAR APPARATUS

(71) Applicant: Panasonic Corporation, Osaka (JP)

(72) Inventor: Takaaki Kishigami, Tokyo (JP)

(73) Assignee: Panasonic Corporation, Osaka (JP)

( * ) Notice: Subject to any disclaimer, the term of this patent is extended or adjusted under 35 U.S.C. 154(b) by 593 days.

(21) Appl. No.: 14/394,734

(22) PCT Filed: Feb. 13, 2014

(86) PCT No.: PCT/JP2014/000742
§ 371 (c)(1),
(2) Date: Oct. 15, 2014

(87) PCT Pub. No.: WO2014/129150
PCT Pub. Date: Aug. 28, 2014

(65) Prior Publication Data
US 2015/0061922 A1    Mar. 5, 2015

(30) Foreign Application Priority Data

Feb. 22, 2013 (JP) ................................ 2013-033650

(51) Int. Cl.
*G01S 13/42* (2006.01)
*G01S 13/48* (2006.01)
(Continued)

(52) U.S. Cl.
CPC ............ *G01S 13/42* (2013.01); *G01S 7/2813* (2013.01); *G01S 7/292* (2013.01); *G01S 13/48* (2013.01);
(Continued)

(58) Field of Classification Search
CPC ........ G01S 13/42; G01S 13/685; G01S 13/48; G01S 7/2813; G01S 7/292; G01S 2013/0245; G01S 13/931
See application file for complete search history.

(56) References Cited

U.S. PATENT DOCUMENTS 7,486,230 B2 *   2/2009   Takano .................. G01S 13/42
                                                    342/147
7,724,181 B2 *   5/2010   Natsume ............... G01S 13/426
                                                    342/103
(Continued)

FOREIGN PATENT DOCUMENTS

JP       2002-243826 A1    8/2002
JP       2006-121513 A     5/2006
(Continued)

OTHER PUBLICATIONS

International Search Report, dated Mar. 25, 2014, for International Application No. PCT/JP2014/000742, 9 pages.
(Continued)

*Primary Examiner* — Matthew M Barker
(74) *Attorney, Agent, or Firm* — Seed IP Law Group LLP

(57) ABSTRACT

A radar receiver receives reflection wave signals which are a radar transmission signal reflected by a target with plural respective antenna system processors, and estimates an incoming direction of the reflection wave signals. A correlation vector power calculator calculates a correlation vector power based on a correlation vector including outputs of the plural respective antenna system processors. A direction vector correlation calculator calculates a direction vector correlation power on the basis of the correlation vector and a direction vector including information of amplitude and phase deviations that occur between the plural respective antenna system processors for each azimuth angle range of an incoming direction of the reflection wave signals. A distance/azimuth angle detector estimates an azimuth angle of an incoming direction of the refection wave signals based on the correlation vector power and the direction vector correlation power.

10 Claims, 18 Drawing Sheets

(51) Int. Cl.
    *G01S 13/68*     (2006.01)
    *G01S 7/292*     (2006.01)
    *G01S 7/28*     (2006.01)
    *G01S 13/93*     (2006.01)
    *G01S 13/02*     (2006.01)

(52) U.S. Cl.
    CPC ........... *G01S 13/685* (2013.01); *G01S 13/931* (2013.01); *G01S 2013/0245* (2013.01)

(56) References Cited

U.S. PATENT DOCUMENTS

| | | | |
|---|---|---|---|
| 8,446,312 B2 * | 5/2013 | Kanamoto | G01S 3/74 342/147 |
| 9,128,182 B2 * | 9/2015 | Kishigami | G01S 7/288 |
| 2002/0126045 A1 | 9/2002 | Kishigami et al. | |
| 2004/0027282 A1 | 2/2004 | Kishigami et al. | |
| 2004/0189523 A1 | 9/2004 | Kishigami et al. | |
| 2010/0109939 A1 | 5/2010 | Nakagawa | |
| 2010/0207806 A1 | 8/2010 | Takahashi et al. | |
| 2012/0293359 A1 | 11/2012 | Fukuda et al. | |
| 2013/0127655 A1 | 5/2013 | Kishigami et al. | |

FOREIGN PATENT DOCUMENTS

| | | |
|---|---|---|
| JP | 2007-263574 A | 10/2007 |
| JP | 2009-031165 A | 2/2009 |
| JP | 2010-112736 A | 5/2010 |
| JP | 2012-181109 A | 9/2012 |
| JP | 2012-225688 A | 11/2012 |
| WO | 2012/020530 A1 | 2/2012 |

OTHER PUBLICATIONS

Kenjirou Chiba, et. al., "Experimental Verification of Antenna Array Calibration Using Known Sources" technical report of IEICE, vol. 102(230), Jul. 17, 2002, 11 pages. (W/ Partial English Translation).

* cited by examiner

RADAR APPARATUS

TECHNICAL FIELD

The present disclosure relates to a radar apparatus which detects a target on the basis of a reflection wave signal reflected from the target.

BACKGROUND ART

Radar apparatus transmit a radio-frequency radar transmission signal to the space from a measuring site, receive a reflection wave signal reflected from a target, and measure at least one of a distance between the measuring site and the target and a direction of the target. In recent years, demand for radar apparatus which can estimate, at a high resolution, a distance to or a signal incoming direction (in a wide range) from a target that may be an automobile or a pedestrian using a short-wavelength radar transmission signal such as a signal of microwaves or millimeter waves has increased.

Among conventional radar apparatus are ones which estimate a signal incoming direction at a higher resolution than the resolution of the beam directivity of each reception antenna by receiving a reflection wave signal reflected from a target with an array antenna and measuring phase differences between reception signals received by the respective reception antennas.

Such radar apparatus can estimate a signal incoming direction at a high resolution by performing signal processing using phase differences between reception signals received by the respective reception antennas, and can estimate a signal incoming angle following a target movement even though it is of a high speed.

In conventional radar apparatus, a Fourier method and a Capon method, for example, are known as signal incoming direction estimation methods using phase differences between reception signals received by an array antenna. In the Fourier method, a radar apparatus calculates a correlation matrix of reception signals received by respective reception antennas and estimates, as a signal incoming direction, an azimuth angle that gives a peak value of an evaluation function which uses the correlation matrix. In the Capon method, a radar apparatus calculates an inverse matrix of a correlation matrix of reception signals received by respective reception antennas and estimates, as a signal incoming direction, an azimuth angle that gives a peak value of an evaluation function which uses the inverse matrix of the correlation matrix.

The Fourier method can decrease the amount of calculation because it is not necessary to calculate an inverse matrix of a correlation matrix. However, large sidelobes in the cross-range direction to make discrimination from a case that plural targets having different reception levels exist difficult, as a result of which the target detection performance in the azimuth angle direction is lowered. The sidelobes in the cross-range direction mean sidelobes that appear at respective distances from a measuring position in reception signal evaluation function profiles (hereinafter referred to as "azimuth profiles") each corresponding to an incoming direction (azimuth angle) of a reflection wave signal reflected from a target. On the other hand, in the Capon method, whereas sidelobes in the cross-range direction mean sidelobes can be made small, it is necessary to calculate an inverse matrix of a correlation matrix, resulting in increase of the calculation amount of the radar apparatus.

For example, Patent documents 1 and 2 are known as disclosing conventional techniques for reducing sidelobes.

In the discrete aperture antenna apparatus disclosed in Patent document 1, a covariance matrix of reception signals received by plural reception antennas which are arranged irregularly with every element interval being longer than or equal to a half wavelength and Capon weights for minimizing output power are calculated using the covariance matrix and a steering vector. Furthermore, in the discrete aperture antenna apparatus, the reception signals are multiplied by the respective Capon weights and resulting signals are added together, whereby grating lobes (sidelobes) are suppressed that are caused by the fact that the element intervals between the reception antennas are longer than or equal to the half wavelength.

In the radar apparatus disclosed in Patent document 2, a first angular spectrum and a second angular spectrum are calculated by multiplying reception signals received by plural reception antennas by a first coefficient group and a second coefficient group, respectively. The first coefficient group consists of coefficients for reducing left-side sidelobes (see FIG. 18(A)) and the second coefficient group consists of coefficients for reducing right-side sidelobes (see FIG. 18(B)).

The radar apparatus judges whether an object exists in an angular range where the level is higher than a threshold value that is set for each of the first and second angular spectra. FIG. 18 shows example azimuth profiles in a conventional radar apparatus. FIG. 18(A) shows an azimuth profile in which sidelobes are reduced on the left side of the azimuth angle 0°. FIG. 18(B) shows an azimuth profile in which sidelobes are reduced on the right side of the azimuth angle 0°.

PRIOR ART DOCUMENTS

Patent Documents

Patent document 1: JP-A-2006-121513
Patent document 2: JP-A-2007-263574

SUMMARY OF THE INVENTION

Problems to be Solved by the Invention

However, in the technique of Patent document 1, the reduction of sidelobes requires a large amount of calculation. In the technique of Patent document 2, whereas sidelobes of an azimuth profile are reduced in accordance with a coefficient group by which reception signals are multiplied, a main beam is expanded, which means degradation of the signal incoming direction estimation performance of the radar apparatus.

The present disclosure has been made to solve the above problems of the prior art, and an object of the disclosure is therefore to provide a radar apparatus which reduces sidelobes in the cross-range direction uniformly while suppressing increase of the amount of calculation for estimation of a signal incoming direction.

Means for Solving the Problems

This disclosure provides a radar apparatus comprising a radar transmitter which converts a transmission signal into a radio-frequency radar transmission signal and transmits the radar transmission signal from a transmission antenna; and a radar receiver which estimates an incoming direction of reflection wave signals which are the radar transmission signal reflected by a target, using plural antenna system processors which receive the reflection wave signals with plural respective antennas and generate a signal including a correlation vector between the transmission signal and the reflection wave signals, wherein the radar receiver includes: a correlation vector power calculator which calculates a correlation vector power on the basis of the signal including the correlation vector; a direction vector correlation calculator which calculates a direction vector correlation power on the basis of the signal including the correlation vector and a direction vector including amplitude and phase difference information that occurs depending on the azimuth angle of the incoming direction of the reflection wave signals; and a target detector which estimates an azimuth angle of the incoming direction of the refection wave signals on the basis of the correlation vector power and the direction vector correlation power.

Advantages of the Invention

The disclosure can reduce sidelobes in the cross-range direction while suppressing increase of the amount of calculation for estimation of a signal incoming direction.

BRIEF DESCRIPTION OF THE DRAWINGS

FIG. 8(A) shows a case of a single target and FIG. 8(B) shows a case of two targets.

FIG. 18(A) shows an azimuth profile in which sidelobes are reduced on the left side of the azimuth angle 0°, and FIG. 18(B) shows an azimuth profile in which sidelobes are reduced on the right side of the azimuth angle 0°.

MODES FOR CARRYING OUT THE INVENTION (Background of Radar Apparatus According to Embodiments of Disclosure)

First, before description of radar apparatus according to embodiments of disclosure, a description will be made of their background.

In the discrete aperture antenna apparatus disclosed in Patent document 1, Capon weights are calculated using a covariance matrix a of reception signals received by plural reception antennas and a steering vector. And an inverse matrix of the covariance matrix is calculated in calculating Capon weights. This results in increase of the calculation amount of the discrete aperture antenna apparatus.

Figure 18:
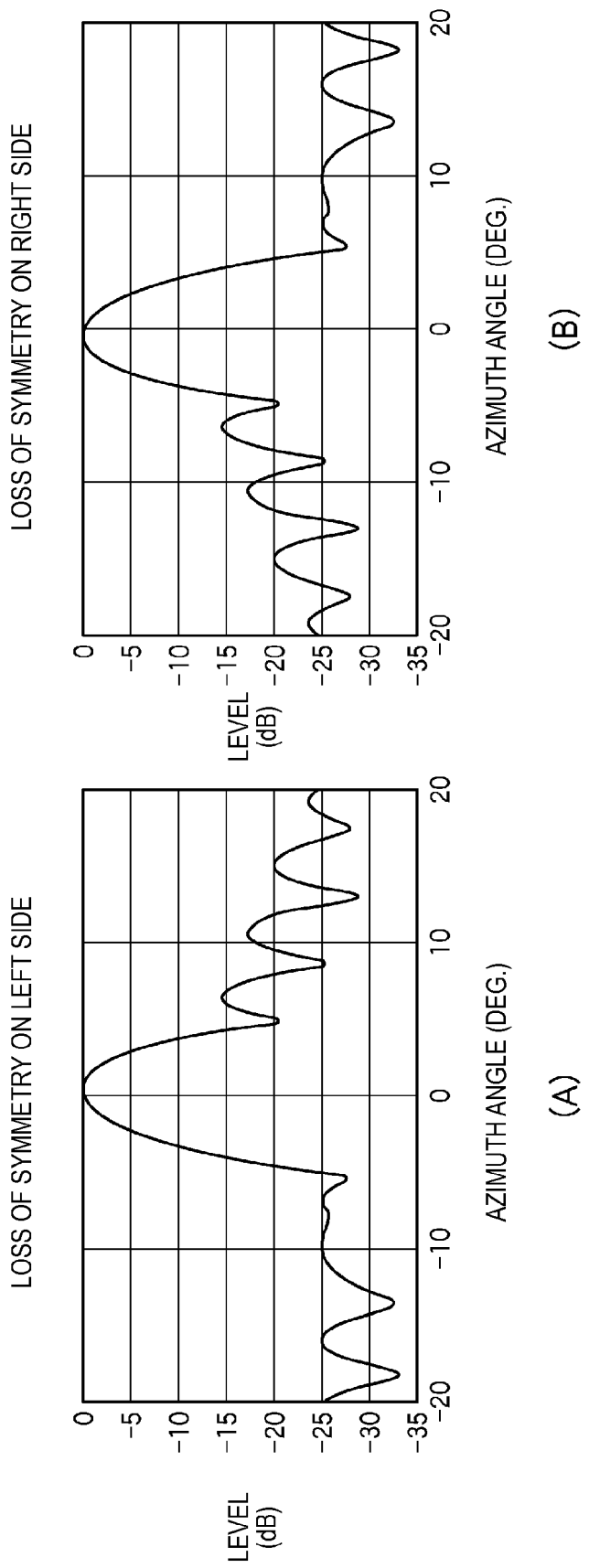
FIG. 18 shows example azimuth profiles in a conventional radar apparatus.

In the radar apparatus disclosed in Patent document 2, sidelobes are reduced partially, that is, on the left side or right side of the azimuth angle 0°, a main beam of an azimuth profile is expanded (see FIGS. 18(A) and 18(B)). As a result, in the radar apparatus, it may become difficult to discriminate between a main beam and sidelobes in an azimuth profile. That is, the radar apparatus is lowered in the performance of estimating an azimuth angle of a signal incoming direction from a target.

In view of the above, each of the following embodiments is directed to an example radar apparatus which suppresses increase of the amount of calculation for estimation of a signal incoming direction and reduces sidelobes in the cross-range direction.

Radar apparatus according to the respective embodiments of the disclosure will be hereinafter described with reference to the drawings.

Embodiment 1

Figure 1:
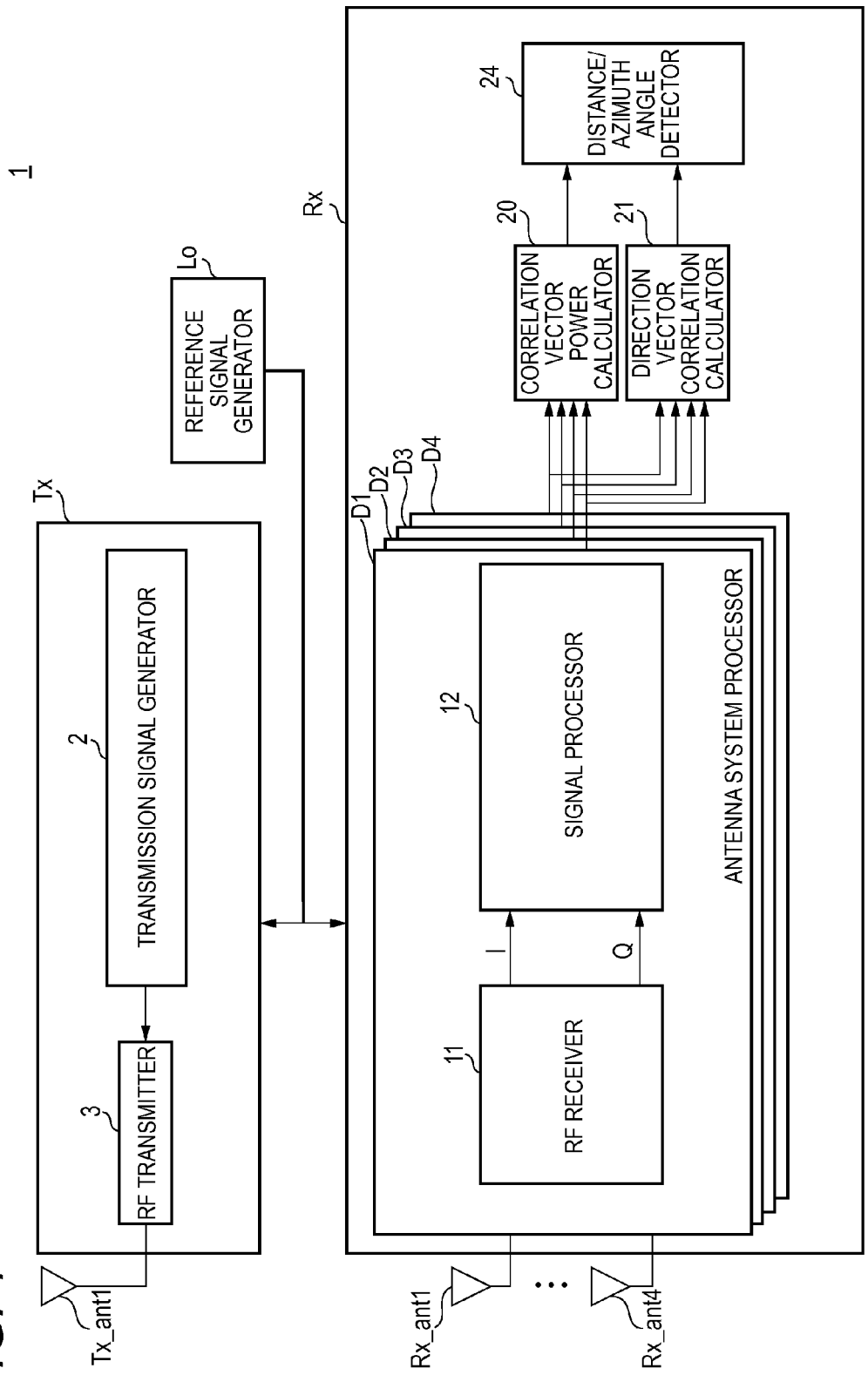
FIG. 1 is a block diagram showing the internal configuration of a radar apparatus according to a first embodiment in a simplified manner.
Figure 2:
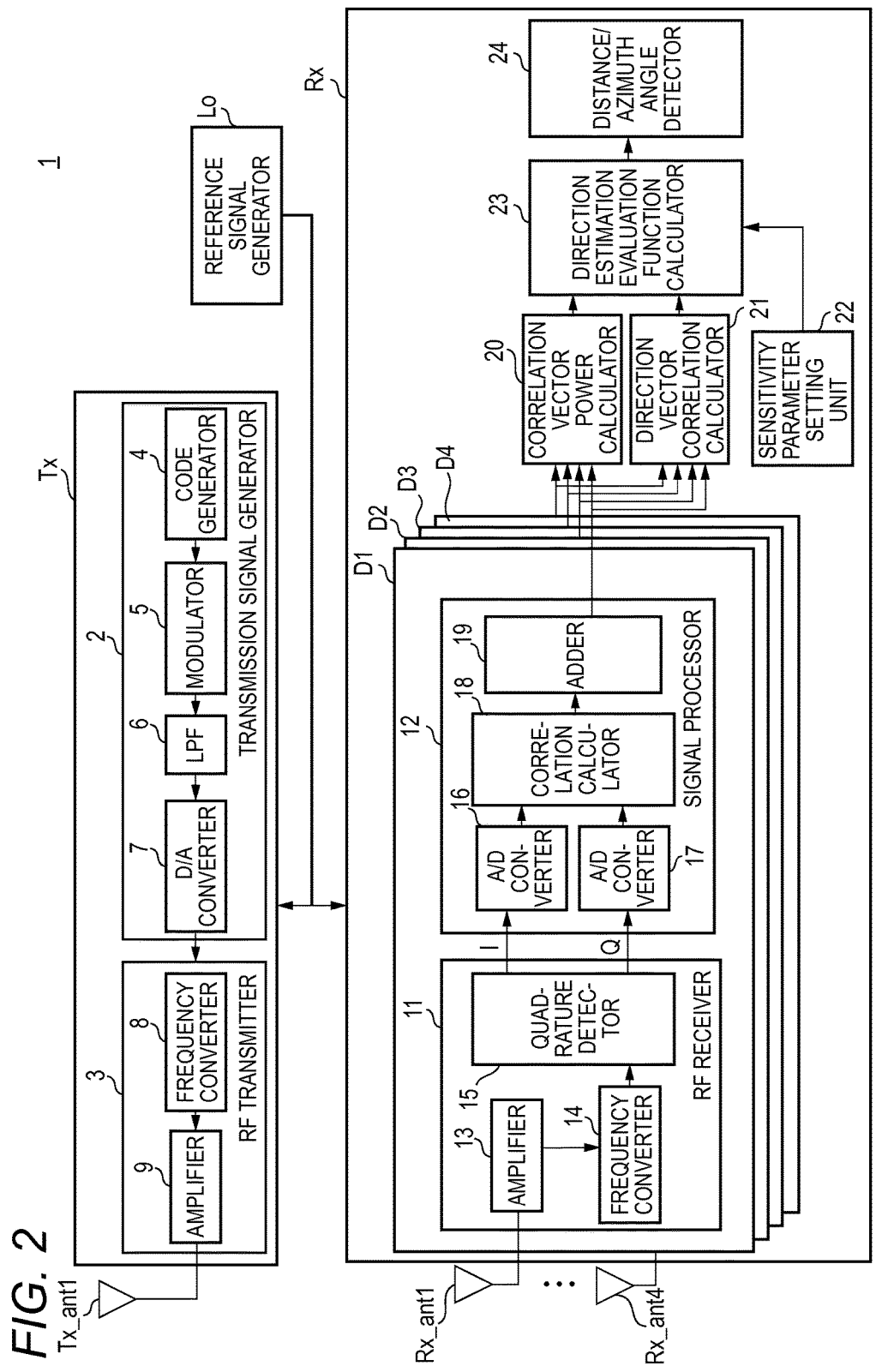
FIG. 2 is a block diagram showing the internal configuration of the radar apparatus according to the first embodiment in detail.
Figure 3:
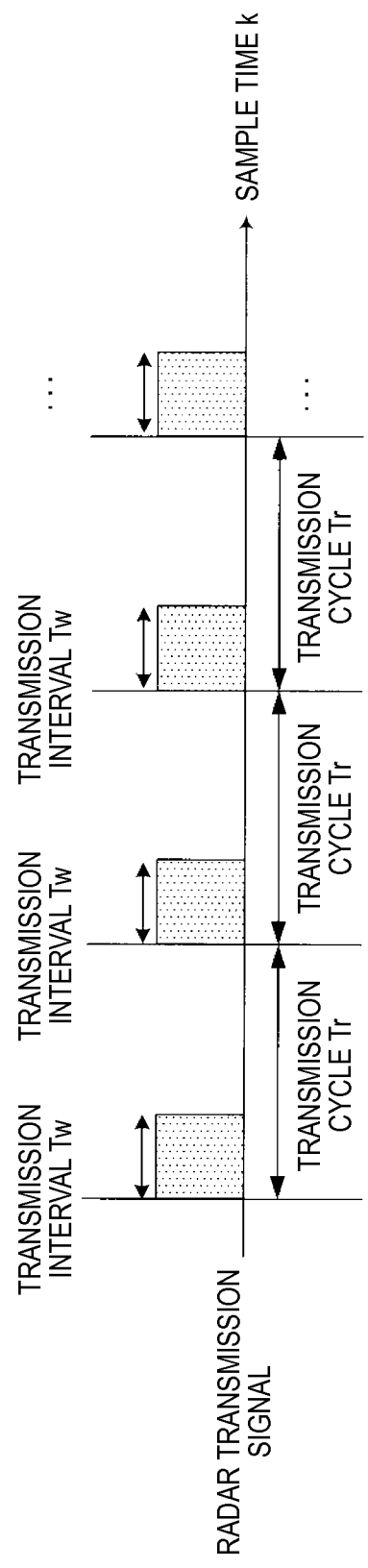
FIG. 3 illustrates a relationship between transmission intervals and transmission cycles of a radar transmission signal.

How a radar apparatus 1 according to a first embodiment is configured and operates will be described with reference to FIGS. 1 to 6. FIG. 1 is a block diagram showing the internal configuration of the radar apparatus 1 according to the first embodiment in a simplified manner. FIG. 2 is a block diagram showing the internal configuration of the radar apparatus 1 according to the first embodiment in detail. FIG. 3 illustrates a relationship between transmission intervals and transmission cycles of a radar transmission signal.

The radar apparatus 1 transmits (radiates) a radio-frequency radar transmission signal generated by a radar transmitter Tx from a transmission antenna Tx_ant1. The radar apparatus 1 receives, with an array antenna (e.g., four reception antennas Rx_ant1 to Rx_ant4 shown in FIG. 1), a reflection wave signal which is a radar transmission signal as reflected by a target (not shown). The radar apparatus 1 performs signal processing on reflection wave signals received by the four reception antennas Rx_ant1 to Rx_ant4 and thereby detects presence/absence of a target.

The target is an object to be detected by the radar apparatus 1 and may be an automobile or a human. This also applies to each of the following embodiments. The reception antennas Rx_ant1 to Rx_ant4 may be reception antenna elements.

First, how the individual elements of the radar apparatus 1 are configured will be described in a simplified manner.

The radar apparatus 1 shown in FIG. 1 includes a reference signal generator Lo, the radar transmitter Tx, and a radar receiver Rx. The radar transmitter Tx has a transmission signal generator 2 and an RF transmitter 3 to which the transmission antenna Tx_ant1 is connected.

The reference signal generator Lo is connected to the radar transmitter Tx and the radar receiver Rx. The reference signal generator Lo supplies a common reference signal to the radar transmitter Tx and the radar receiver Rx, whereby processing of the radar transmitter Tx and processing of the radar receiver Rx are synchronized with each other.

The radar receiver Rx has four antenna system processors D1, D2, D3, and D4 (four is an example number), a correlation vector power calculator 20, a direction vector correlation calculator 21, and a distance/azimuth angle detector 24. Although the radar receiver Rx shown in FIG. 1 has the four antenna system processors D1-D4, the number of antenna system processors is not limited to four and may be two or more. Since the antenna system processors have the same configuration, in each of the following embodiments the antenna system processor D1 will be described below as an example.

The antenna system processor D1 has an RF receiver 11 to which the reception antenna Rx_ant1 is connected and a signal processor 12.

Next, how the individual elements of the radar transmitter Tx are configured will be described in detail with reference to FIG. 2.

The radar transmitter Tx shown in FIG. 2 has the transmission signal generator 2 and the RF transmitter 3 to which the transmission antenna Tx_ant1 is connected.

The transmission signal generator 2 has a code generator 4, a modulator 5, an LPF (lowpass filter) 6, and a D/A (digital to analog) converter 7. Although in FIG. 2 the LPF 6 is included in the transmission signal generator 2, the LPF 6 may be disposed outside the transmission signal generator 2, in which case an output of the LPF 6 is input to the D/A converter 7.

The RF transmitter 3 includes a frequency converter 8 and an amplifier 9.

Next, how the individual elements of the radar transmitter Tx operate will be described in detail.

The transmission signal generator 2 generates a transmission reference clock signal by multiplying a reference signal generated by the reference signal generator Lo by a prescribed number. The individual elements of the transmission signal generator 2 operate on the basis of the transmission reference clock signal.

As for a baseband transmission signal generated by the transmission signal generator 2, each code element of a code sequence $C_n$ having a code length L is modulated using No samples of the transmission reference clock signal in a transmission interval Tw (s) of each transmission cycle Tr shown in FIG. 3. Parameter n varies from 0 to L (>0), where L (integer) represents the code length of the code sequence $C_n$.

The sampling rate in the transmission signal generator 2 is equal to (No×L)/Tw. Therefore, in each transmission interval Tw, the transmission signal generator 2 performs modulation using Nr (=No×L) samples. In the silent interval (Tr−Tw) (s) of each transmission cycle Tr, modulation is done using Nu samples.

The transmission signal generator 2 periodically generates a baseband transmission signal r(k, M) (see Equation (1)) by modulating the code sequence $C_n$ having the code length L. Parameter j is the imaginary number unit which satisfies $j^2=-1$. Time k is sample time which is defined with a start time of each radar transmission cycle Tr as a reference (k=1) and represents generation timing of a transmission signal. Parameter k takes values 1 to Nr+Nu.

Parameter M represents the ordinal number of the transmission cycle Tr of a radar transmission signal. The transmission signal r(k, M) represents a transmission signal at the sample time k of an Mth transmission cycle Tr, and is an addition result of an in-phase signal component I(k, M) and the product of the imaginary number unit j and a quadrate signal component Q(k, M) (see Equation (1)).

[Formula 1]

$$r(k,M)=I(k,M)+jQ(k,M) \tag{1}$$

The code generator 4 generates a transmission code of the code sequence $C_n$ having the code length L every transmission cycle Tr. For example, the elements of the code sequence $C_n$ are formed using two values [−1, 1] or four values [1, −1, j, −j]. For the radar receiver Rx to have a low-level sidelobe characteristic, it is desirable that the transmission code be a code including at least one of, for example, a pair of code sequences of a complementary code, a Barker code sequence, a Golay code sequence, an M-sequence code, and code sequences constituting a Spano code. The code generator 4 outputs the generated transmission code of the code sequence $C_n$ to the modulator 5. In the following description, for the sake of convenience, the transmission code of the code sequence $C_n$ will be written as a transmission code $C_n$.

To generate a pair of transmission codes of a complementary code (e.g., Golay code sequences or Spano code sequences) as the transmission code $C_n$, the code generator 4 generates a pair of transmission codes $P_n$ and $Q_n$ every two transmission cycles (2Tr) so as to generate them alternately (one of them is generated in each transmission cycle). That is, in an Mth transmission cycle, the code generator 4 generates the one transmission code $P_n$ of the pair of transmission codes of the complementary code and outputs it to the modulator 5. In the next, (M+1)th transmission cycle, the code generator 4 generates the other transmission code $Q_n$ of the pair of transmission codes of the complementary code and outputs it to the modulator 5. Likewise, in the (M+2)th and following transmission cycles, the code generator 4 generates the transmission codes $P_n$ and $Q_n$ repeatedly and outputs them to the modulator 5 every two transmission cycles which are the same in length as the Mth and (M+1)th transmission cycles.

The modulator 5 receives the transmission code $C_n$ generated by the code generator 4. The modulator 5 generates a baseband transmission signal r(k, M) of Equation (1) by pulse-modulating the transmission code $C_n$. The pulse modulation is amplitude modulation, ASK (amplitude shift keying) or phase modulation (PSK (phase shift keying)). This also applies to each of the following embodiments.

For example, where the code sequence $C_n$ uses two values [−1, 1], the phase modulation (PSK) becomes BPSK (binary phase shift keying). Where the code sequence $C_n$ uses four values [1, −1, j, −j], the phase modulation (PSK) becomes QPSK (quadrature phase shift keying) or 4-phase PSK. That is, in the phase modulation (PSK), prescribed modulation symbols of a constellation on the IQ plane are assigned.

The modulator 5 outputs a transmission signal r(k, M), in a preset limited band or lower, of the generated transmission signal r(k, M) to the D/A converter 7 via the LPF 6. The LPF 6 may be omitted in the transmission signal generator 2 and disposed downstream of the D/A converter 7. This also applies to each of the following embodiments.

The D/A converter 7 converts the digital transmission signal r(k, M) generated by the modulator 5 into an analog transmission signal. The D/A converter 7 outputs the analog transmission signal to the RF transmitter 3.

The RF transmitter 3 generates a transmission reference signal in a carrier frequency band by multiplying the reference signal generated by the reference signal generator Lo by a prescribed number. Either different multiplication factors or the same multiplication factor may be used for generating transmission signals for the transmission signal generator 2 and the RF transmitter 3. The individual elements of the RF transmitter 3 operate on the basis of the transmission reference signal(s).

The frequency converter 8 generates a radar transmission signal in a carrier frequency band (a radio frequency band such as a millimeter wave band) by up-converting the transmission signal r(k, M) generated by the transmission signal generator 2. The frequency converter 8 outputs the radar transmission signal to the amplifier 9.

The amplifier 9 amplifies the signal level of the radar transmission signal generated by the frequency converter 8 to a prescribed signal level, and outputs the amplified signal to the transmission antenna Tx_ant1. The radar transmission signal amplified by the amplifier 9 is radiated to the space from the transmission antenna Tx_ant1.

The transmission antenna Tx_ant1 radiates (transmits) the radar transmission signal generated by the RF transmitter 3 to the space. The radar transmission signal is transmitted during the transmission interval Tw of each transmission cycle Tr and is not transmitted during the non-transmission interval Tr−Tw (see FIG. 3).

The common reference signal generated by the reference signal generator Lo by the prescribed number is supplied to the RF transmitter 3 and the RF receivers of the respective antenna system processors D1-D4. The RF transmitter 3 operates on the basis of a transmission reference signal obtained by multiplying the reference signal by a prescribed number, and the RF receivers of the antenna system processors D1-D4 operate on the basis of a reception reference signal obtained by multiplying the reference signal by the same prescribed number as for the RF transmitter 3. This allows the RF transmitter 3 and the RF receivers of the antenna system processors D1-D4 to operate in synchronism with each other.

Figure 4:
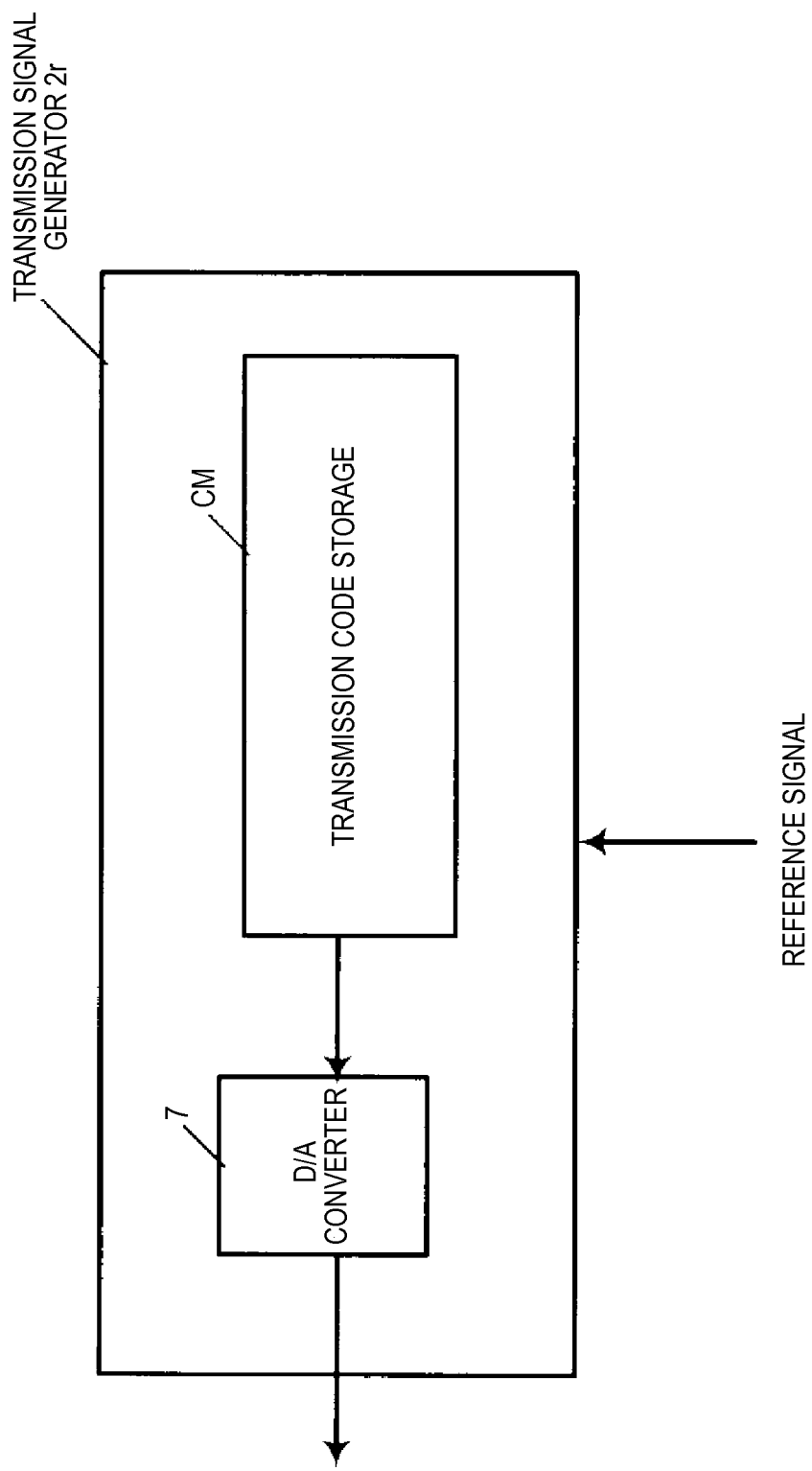
FIG. 4 is a block diagram showing the internal configuration of another transmission signal generator 2r.

Another configuration is possible in which the code generator 4, the modulator 5, and the LPF 6 are not provided in the transmission signal generator 2 and, instead, a transmission code storage CM for storing a transmission code $C_n$ generated by the transmission signal generator 2 in advance is provided (see FIG. 4). FIG. 4 is a block diagram showing the internal configuration of another transmission signal generator 2r.

For a case that the transmission signal generator 2 generates a pair of transmission codes of a complementary code, the transmission code storage CM may be stored with, for example, a pair of transmission codes of a complementary code such as transmission codes $P_n$ and $Q_n$. The configuration shown in FIG. 4 of the transmission code storage CM is applicable to not only this embodiment but also each of the following embodiments. The transmission signal generator 2r has the transmission code storage CM and a D/A converter 7.

The transmission code $C_n$ or the transmission codes $P_n$ and $Q_n$ as a pair of transmission codes of a complementary code are read from the transmission code storage CM cyclically every transmission cycle Tr on the basis of the transmission reference clock signal produced by multiplying the reference signal generated by the reference signal generator Lo by the prescribed number, and are output to the D/A converter 7. An operation performed thereafter is the same as performed by the above-described D/A converter 7, and hence a description therefor will be omitted.

(Radar Receiver)

Next, how the individual elements of the radar receiver Rx are configured will be described with reference to FIG. 2.

The radar receiver Rx shown in FIG. 2 has the four antenna system processors D1-D4 which correspond in number to the reception antennas which, for example, constitute an array antenna, the correlation vector power calculator 20, the direction vector correlation calculator 21, a sensitivity parameter setting unit 22, a direction estimation evaluation function calculator 23, and the distance/azimuth angle detector 24.

The antenna system processor D1 has the RF receiver 11 to which the reception antenna Rx_ant1 is connected and the signal processor 12. The RF receiver 11 has an amplifier 13, a frequency converter 14, and a quadrature detector 15. The signal processor 12 has two A/D converters 16 and 17, a correlation calculator 18, and an adder 19. The radar receiver Rx performs a calculation periodically with each transmission cycle Tr of a radar transmission signal as a signal processing interval of the signal processors of the respective antenna system processors. D1-D4

Figure 5:
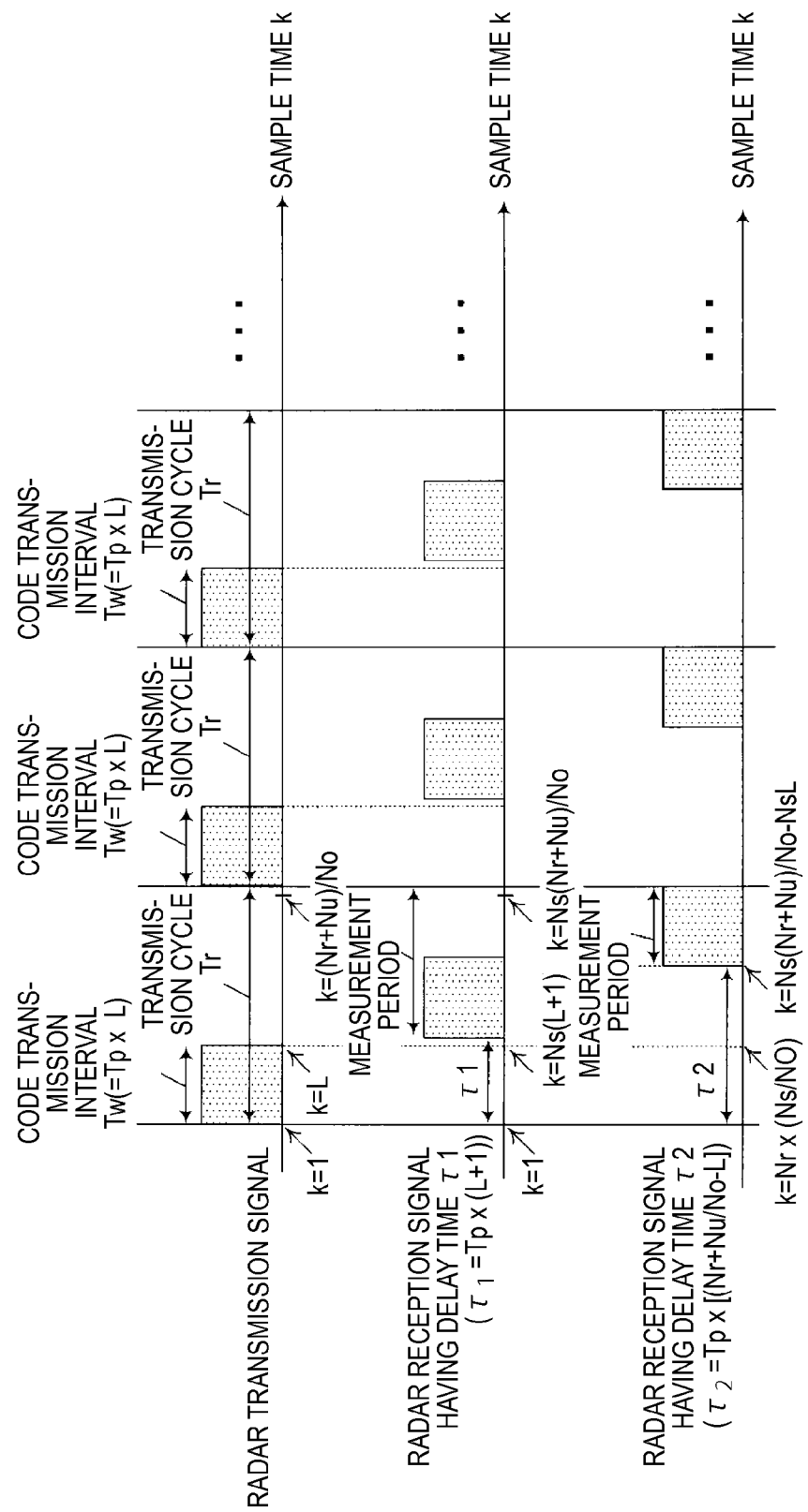
FIG. 5 shows relationships between a radar transmission signal, a radar reception signal having a delay time $\tau_1$, and a radar reception signal having a delay time $\tau_2$.
Figure 6:
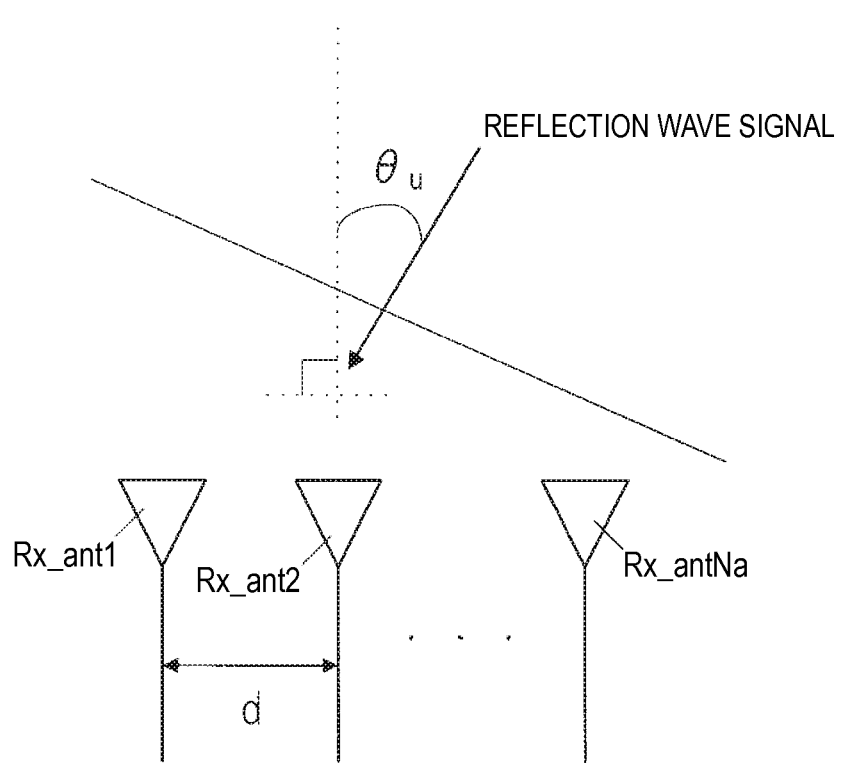
FIG. 6 illustrates a relationship between the arrangement of individual reception antenna elements constituting an array antenna and an azimuth angle θ.

Next, how the individual elements of the radar receiver Rx operate will be described in detail with reference to FIGS. 2, 5, and 6. FIG. 5 shows relationships between a radar transmission signal, a radar reception signal having a delay time and a radar reception signal having a delay time $\tau_2$. FIG. 6 illustrates a relationship between the arrangement of the individual reception antenna elements constituting an array antenna and an azimuth angle θ.

The reception antenna Rx_ant1 receives a reflection wave signal that is a radar transmission signal transmitted from the radar transmitter Tx and reflected by a target. The radio-frequency reception signal received by the reception antenna Rx_ant1 is input to the RF receiver 11.

Like the RF transmitter 3, the RF receiver 11 generates a reception reference signal in the carrier frequency band by multiplying the reference signal generated by the reference signal generation Lo by a prescribed number. The individual elements of the RF receiver 11 operate on the basis of the reception reference signal.

The amplifier 13 receives the radar reception signal received by the reception antenna Rx_ant1, amplifies the signal level of the radar reception signal, and outputs a resulting signal to the frequency converter 14.

The frequency converter 14 receives the radar reception signal amplified by the amplifier 13, and generates a baseband reception signal by down-converting the radio-frequency radar reception signal into the baseband using the reception reference signal. The frequency converter 14 outputs the baseband reception signal to the quadrature detector 15.

The quadrature detector 15 generates a reception signal consisting of an in-phase signal and a quadrate signal by quadrature-detecting the baseband reception signal generated by the frequency converter 14. The quadrature detector 15 outputs the in-phase signal and the quadrate signal of the baseband reception signal to the respective A/D converters 16 and 17.

The A/D converter 16 samples, every sample time k, the baseband in-phase signal generated by the quadrature detector 15 and thereby converts the in-phase signal (analog data) into digital data. The A/D converter 16 outputs the in-phase signal component (digital data) to the correlation calculator 18.

The A/D converter 16 performs sampling Ns times per pulse width (pulse duration) Tp (=Tw/L) of a transmission signal r(k, M) generated by the radar transmitter Tx. That is, the sampling rate of the A/D converter 16 is equal to (Ns×L)/Tw=Ns/Tp and its over-sampling number per pulse is equal to Ns.

The A/D converter 17 processes the baseband quadrate signal generated by the quadrature detector 15 by operating in the same manner as the A/D converter 16, and outputs a resulting quadrate signal component (digital data) to the correlation calculator 18. The sampling rate of the A/D converter 17 is equal to Ns/Tp and its over-sampling number per pulse is equal to Ns.

In the following description, a baseband reception signal at a sample time k of an Mth transmission cycle Tr produced by the A/D converters 16 and 17 will be expressed as a complex signal x(k, M) (see Equation (2)) using an in-phase signal component Ir(k, M) and a quadrate signal component Qr(k, M):

[Formula 2]

$$x(k,M)=Ir(k,M)+jQr(k,M) \quad (2)$$

The first stage of FIG. 5 shows transmission timing of a radar transmission signal. In the first stage of FIG. 5,
In the following description, a start time point of each transmission cycle Tr is used as a reference point (k=1) of the sample time k. The signal processor 12 operates periodically until a sampling point k=Ns(Nr+Nu)/No that is immediately before the end of each radar transmission cycle Tr.

That is, the signal processor 12 operates periodically in a period in which the sample time k varies from 1 to Ns(Nr+Nu)/No (see the second stage of FIG. 5). The second stage of FIG. 5 shows reception timing of a radar reception signal having a delay time $\tau_1$. The third stage of FIG. 5 shows reception timing of a radar reception signal having a delay time $\tau_2$. A sample time k=Nr×Ns/No represents a time point immediately before the end of the transmission interval Tw of each transmission cycle Tr. In the following description, a digital reception signal x(k, M) that is output from the A/D converters 16 and 17 will be referred to as a discrete sample value x(k, M).

The correlation value calculator 18 receives discrete sample values Ir(k, M) and Qr(k, M) that are output from the A/D converters 16 and 17, that is, a discrete sample value x(k, M) as a reception signal. Based on the reception reference clock signal produced by multiplying the reference signal generated by the reference signal generator Lo by the prescribed number, the correlation calculator 18 periodically generates, every sample time k, a transmission code $C_n$ having the code length L. Parameter n takes values 1 to L and parameter L represents the code length of the code sequence $C_n$.

The correlation calculator 18 calculates a sliding correlation value AC(k, M) between the discrete sample value x(k, M) and the transmission code $C_n$. Symbol AC(k,M) represents a sliding correlation value at a sample time k.

More specifically, the correlation calculator 18 calculates sliding correlation values AC(k, M) in each transmission cycle $T_r$ shown in the second stage of FIG. 5, that is, for respective sample times k (=1 to Ns(Nr+Nu)/No), according to Equation (3). The correlation calculator 18 outputs, to the adder 19, the sliding correlation values AC(k, M) that have been calculated for the respective sample times k according to Equation (3). Asterisk "*" in Equation (3) is the complex conjugate operator.

[Formula 3]

$$AC(k, M) = \sum_{n=1}^{L} x(k + Ns(n-1), M)C_n^* \quad (3)$$

The second stage of FIG. 5 shows measurement periods in the radar receiver Rx in a case that a radar reception signal is received after a lapse of a delay time $\tau_1$ from the start of transmission of a radar transmission signal. The third stage of FIG. 5 shows measurement periods in the radar receiver Rx in a case that a radar reception signal is received after a lapse of a delay time $\tau_2$ from the start of transmission of a radar transmission signal. The delay times $\tau_1$ and $\tau_2$ are given by Equations (4) and (5), respectively.

[Formula 4]

$$\tau_1 = Tp \times (L+1) \quad (4)$$

[Formula 5]

$$\tau_2 = Tp \times \left\{ \frac{(Nr+Nu)}{No} - L \right\} \quad (5)$$

In each of the embodiments including this embodiment, the correlation calculator 18 calculates sliding correlation values AC(k, M) at sample times k=1 to Ns(Nr+Nu)/No. The correlation calculator 18 may narrow the measurement period range (the range of sample times k) in accordance with the range of presence of a target to be measured by the radar apparatus 1. With this measure, in the radar apparatus 1, the amount of calculation of the correlation calculator 18 can be reduced further. That is, the power consumption of the radar apparatus 1 can be lowered further through reduction of the amount of calculation of the signal processor 12.

In the radar apparatus 1, where the correlation calculator 18 calculates sliding correlation values AC (k, m) at sample times k being in a range of Ns(L+1) to Ns(Nr+Nu)/No−NsL, the transmission interval $T_w$ of each transmission cycle Tr of a radar transmission signal may be excluded from the measurement period.

In this case, in the radar apparatus 1, even though a radar transmission signal goes around to enter the radar receiver Rx directly, a measurement can be performed with its influence eliminated. With the above restriction of the measurement period range (the range of sample times k), the adder 19, the correlation vector power calculator 20, the direction vector correlation calculator 21, the direction estimation evaluation function calculator 23, and the distance/azimuth angle detector 24 also operate in the same restricted measurement period range. Therefore, the processing amounts of these elements can be reduced and the power consumption of the radar receiver Rx can be lowered accordingly.

The adder 19 adds together sliding correlation values AC(k, M) in a prescribed number (Np) of transmission cycles $T_r$ (a period Np×$T_r$) on the basis of sliding correlation values AC(k, M) that have been calculated for each sample time k in Mth transmission cycles $T_r$.

More specifically, the adder 19 calculates an addition value Cl(k, m) for each sample time k in an mth set of Np transmission cycles $T_r$ according to Equation (6) by adding together, for each sample time k, sliding correlation values AC(k, M) in the prescribed number (Np) of transmission cycles $T_r$ (period Np×$T_r$). Parameter Np is the prescribed number representing the number of times the addition is performed in the adder 19. Parameter m is the ordinal number of each set of Np times of addition performed by the adder 19 of each antenna system processor. The adder 19 outputs the addition value Cl(k, m) to the correlation vector power calculator 20 and the direction vector correlation calculator 21.

[Formula 6]

$$Cl(k, m) = \sum_{g=1}^{Np} AC(k, Np(m-1)+g) \quad (6)$$

Adding together Np sliding correlation values AC(k, M), the adder 19 can suppress noise components contained in a reflection wave signal in such a range that the reflection wave signal exhibits high correlation and thereby improve the reception quality (SNR: signal to noise radio) of the reflection wave signal. Furthermore, capable of improving the reception quality of a reflection wave signal reflected from a target, the adder 19 can increase the accuracy of estimation of a signal incoming direction of the reflection wave signal.

To obtain an ideal addition gain, it is necessary that phase components of sliding correlation values AC(k, M) fall within a certain range in an addition period of Np times of addition. That is, since a phase variation occurs as a target moves, it is desirable that the number Np of times of addition be set in accordance with an assumed maximum movement speed of a target. As the assumed maximum movement speed of a target increases, the variation of the Doppler frequency of a reflection wave signal reflected from the target increases and the discrete time interval when a large correlation value is obtained becomes shorter. As a result, the number Np of times of addition is decreased and the gain increasing effect of the addition of the adder 19 is lowered.

To detect phase differences between the reception antennas of a reflection wave signal reflected from a target, the correlation vector power calculator 20 generates a correlation vector h(k, m) by combining addition values $Cl^1$(k, m), $Cl^2$(k, m), $Cl^3$(k, m), and $Cl^4$(k, m) which are outputs of the adders of the respective antenna system processors D1-D4 (see Equation (7)).

The correlation vector power calculator 20 calculates a correlation vector power $P_{out}$(k, m) on the basis of the correlation vector h(k, m) according to Equation (8). In Equation (7), Na represents the number of reception antennas, which is four in the radar receiver Rx shown in FIG. 2. In Equation (8), superscript H is the complex conjugate transpose operator. The correlation vector power calculator 20 outputs the correlation vector power $P_{out}$(k, m) to the direction estimation evaluation function calculator 23.

[Formula 7]

$$h(k, m) = \begin{bmatrix} Cl^1(k, m) \\ Cl^2(k, m) \\ \vdots \\ Cl^{Na}(k, m) \end{bmatrix} \quad (7)$$

[Formula 8]

$$P_{out}(k, m) = h(k, m)^H h(k, m) \quad (8)$$

The correlation vector power calculator 20 may calculate a correlation vector h(k, m) according to Equation (9) rather than Equation (7) using, as a reference phase, a phase of a radar reception signal received by the reception antenna of one of the plural antenna system processors D1-D4 (e.g., the reception antenna Rx_ant1 of the antenna system processor D1). This also applies to each of the following embodiments. In Equation (9), the asterisk "*" (superscript) is the complex conjugate operator. With this measure, the radar apparatus 1 can reduce the amount of calculation of the correlation vector power calculator 20 and thereby calculate, in a simple manner, phase differences between the reception antennas of a reflection wave signal reflected from a target.

[Formula 9]

$$h(k, m) = \begin{bmatrix} Cl^1(k, m) \\ Cl^2(k, m) \\ \vdots \\ Cl^{Na}(k, m) \end{bmatrix} Cl^1(k, m)^* \quad (9)$$

To detect phase differences between the reception antennas of the reflection wave signal reflected from the target, the direction vector correlation calculator 21 generates a correlation vector h(k, m) by combining addition values $Cl^1$(k, m), $Cl^2$(k, m), $Cl^3$(k, m), and $Cl^4$(k, m) which are outputs of the adders of the respective antenna system processors D1-D4 (see Equation (7)).

The direction vector correlation calculator 21 is stored in advance with a direction vector a($\theta_u$) which represents complex responses of the respective reception antennas that are produced when a reflection wave signal reflected from a target arrives from the direction of an azimuth angle $\theta_u$. The complex responses of the respective reception antennas, which are measured in advance in an anechoic chamber, for example, include phase difference information that is calculated geometrically on the basis of the intervals between the reception antennas, the degrees of coupling between the reception antennas (antenna elements), and deviation information such as amplitude errors and phase errors. This also applies to each of the following embodiments.

For example, where the reception antenna elements constituting an array antenna are arranged on a straight line at the same interval d (see FIG. 6), an ideal direction vector $a(\theta_u)$ that is free of any phase deviations or amplitude deviations between the reception antennas is given by Equation (10). FIG. 6 illustrates a relationship between the arrangement of the individual reception antennas Rx_ant1 to Rx_antNa constituting an array antenna and an azimuth angle $\theta_u$.

[Formula 10]

$$a(\theta_u) = \begin{bmatrix} 1 \\ \exp\{-j 2\pi d \sin\theta_u / \lambda\} \\ \vdots \\ \exp\{-j 2\pi (Na-1) d \sin\theta_u / \lambda\} \end{bmatrix} \quad (10)$$

The direction vector correlation calculator 21 calculates a direction vector correlation power $F_{out}(k, m, \theta_u)$ on the basis of the direction vector $a(\theta_u)$ and the correlation vector $h(k, m)$, that is, by squaring the inner product of the direction vector $a(\theta_u)$ and the correlation vector $h(k, m)$ (see Equation (11)). The direction vector correlation calculator 21 outputs the direction vector correlation power $F_{out}(k, m, \theta_u)$ to the direction estimation evaluation function calculator 23.

In each of the following embodiments, the azimuth angle $\theta_u$ is a variable which varies in units of a prescribed interval $\Delta\theta$ in an estimation range $[\theta_{min}, \theta_{max}]$ of the incoming direction of a reflection wave signal in the radar apparatus 1 and is given by Equation (12), for example. Parameter u is an integer which varies from 0 to NU. Parameter NU is given by Equation (13). In Equation (13), floor(x) is a function of outputting a maximum integer that does not exceed a real number x.

[Formula 11]

$$F_{out}(k, m, \theta_u) = |a(\theta_u)^H h(k, m)|^2 \quad (11)$$

[Formula 12]

$$\theta_u = \theta_{min} + u\Delta\theta \quad (12)$$

[Formula 13]

$$NU = \text{floor}[(\theta_{max} - \theta_{min})/\Delta\theta] + 1 \quad (13)$$

The sensitivity parameter setting unit 22 outputs, to the direction estimation evaluation function calculator 23, a sensitivity parameter Pn to be used for adjusting the response sensitivity (output accuracy) of a direction estimation evaluation function $P_{DOA}(k, m, \theta_u)$ (described later), having as inputs, phase differences between the reception signals received by the plural respective antenna system processors D1-D4, that is, the plural respective reception antennas Rx_ant1 to Rx_ant4. The sensitivity parameter Pn depends on the system in which the radar apparatus 1 is provided.

The direction estimation evaluation function calculator 23, which serves as an evaluation function calculator, calculates a direction estimation evaluation function $P_{DOA}(k, m, \theta_u)$ to be used for estimating an incoming direction of the reflection wave signal on the basis of the outputs of the correlation vector power calculator 20, the direction vector correlation calculator 21, and the sensitivity parameter setting unit 22 according to Equation (14) while varying the azimuth angle $\theta_u$ for each mth output of the adder 19.

Since $a(\theta_u)^H a(\theta_u)$ in Equation (14) can be calculated in advance by the direction vector correlation calculator 21, for example, this term does not increase the amount of calculation of the direction estimation evaluation function calculator 23. The direction estimation evaluation function calculator 23 outputs the direction estimation evaluation function $P_{DOA}(k, m, \theta_u)$ to the distance/azimuth angle detector 24.

[Formula 14]

$$P_{DOA}(k, m, \theta_u) = 1 \Big/ \left\{ a(\theta_u)^H a(\theta_u) - \frac{F_{out}(k, m, \theta_u)}{Pn + P_{out}(k, m)} \right\} \quad (14)$$

The distance/azimuth angle detector 24, which serves as a target detector, detects a maximum value (peak value) of the direction estimation evaluation function $P_{DOA}(k, m, \theta_u)$ for each sample time k in the range $[\theta_{min}, \theta_{max}]$ of the azimuth angle $\theta_u$. When a maximum value at a certain sample time k is larger than or equal to a prescribed threshold value, the distance/azimuth angle detector 24 estimates that the azimuth angle $\theta_u$ that gives the maximum value at the sample time k is an incoming direction of the reflection wave signal reflected from a target.

Furthermore, the distance/azimuth angle detector 24 estimates a distance D(k) from the measuring site of the radar apparatus 1 to the target according to Equation (15) on the basis of the sample time k at which the direction estimation evaluation function $P_{DOA}(k, m, \theta_u)$ has the maximum value. Symbol $C_0$ represents the speed of light.

[Formula 15]

$$D(k) = \frac{C_0 T p(k-1)}{2Ns} \quad (15)$$

Figure 7:
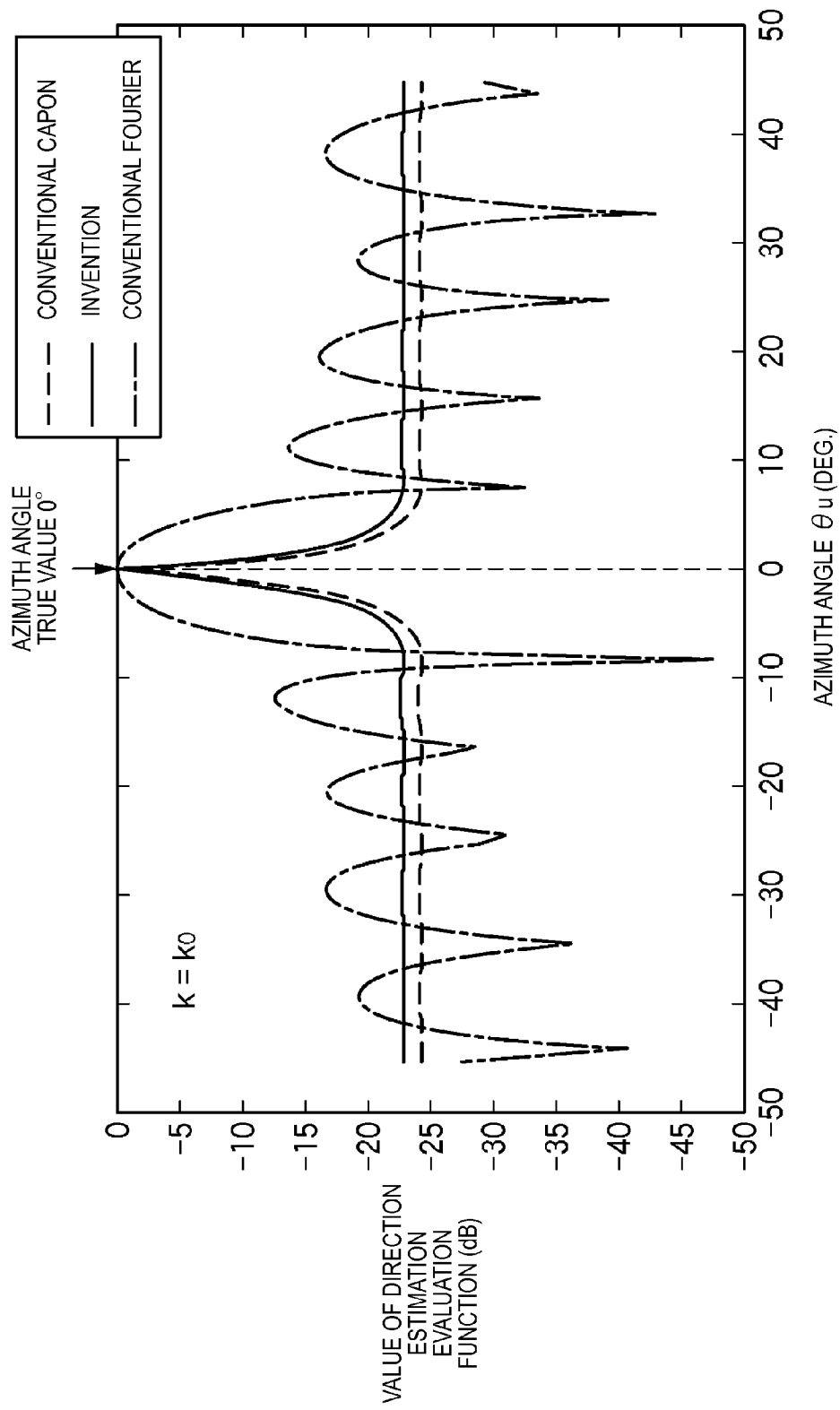
FIG. 7 is a graph comparing example azimuth profiles obtained by the radar apparatus according to the first embodiment and conventional radar apparatus.

FIG. 7 is graphs comparing example azimuth profiles obtained by the radar apparatus 1 according to the first embodiment and conventional radar apparatus. FIG. 7 shows, as an azimuth profile, values of the direction estimation evaluation function $P_{DOA}(k, m, \theta_u)$ in an azimuth angle $\theta_u$ range=$[\theta_{min}=-45°, \theta_{max}=+45°]$ in a case that a reflection wave signal arrives from the direction of an example azimuth angle 0° ($\theta_u=0°$) at a certain sample time $k_0$. The direction estimation evaluation function $P_{DOA}(k, m, \theta_u)$ is calculated according to Equation (14). For comparison, azimuth profiles obtained by the conventional Fourier method and Capon method are also shown.

In the conventional Fourier method, at the sample time $k_0$ at which a reflection wave signal reflected from a target exists, the main beam does not have a sharp peak at the azimuth angle $\theta_u$ ($=0°$) that indicates the incoming direction of the reflection wave signal and high-level sidelobes appear at azimuth angles $\theta_u$ other than the one corresponding to the incoming direction of the reflection wave signal. As such, in the conventional radar apparatus, it is difficult to discriminate between a main beam in an incoming direction of a reflection wave signal reflected from a target and sidelobes. Thus, the accuracy of estimation of the incoming direction of the reflection wave signal is low.

In contrast, in this embodiment, unlike in the conventional Fourier method, at the sample time $k_0$ at which a reflection wave signal reflected from a target exists, the main beam has a sharp peak at the azimuth angle $\theta_u$ ($=0°$) that indicates the incoming direction of the reflection wave signal and sidelobes are suppressed at azimuth angles $\theta_u$ other than the one corresponding to the incoming direction of the reflection wave signal. The azimuth profile of this embodiment is approximately on the same level as that of the conventional Capon method. As such, in the radar apparatus 1 according to this embodiment, a main beam in an incoming direction of a reflection wave signal reflected from a target can be discriminated from sidelobes. Thus, the accuracy of estimation of the incoming direction of the reflection wave signal can be increased.

In the radar apparatus 1 according to this embodiment, the amount of calculation (the number of times of multiplication) of the direction estimation evaluation function $P_{DOA}(k, m, \theta_u)$ for one azimuth angle $\theta_u$ can be expressed as 2Na+1, where Na is the number of reception antennas.

On the other hand, in the conventional Capon method in which an inverse matrix needs to be calculated in calculating a direction estimation evaluation function, the amount of calculation is in the order of $O(Na^3)+Na(Na+1)$, where $O(Na^3)$ represents an amount of calculation in the order of $Na^3$.

In the above-described radar apparatus 1 according to this embodiment, a high-resolution angular spectrum can be obtained while the amount of calculation of the direction estimation evaluation function can be reduced to about ⅛ (about 10%) of that of the conventional Capon method in the case where Na is equal to 4 and to about 1/34 (about 3%) in the case where Na is equal to 8.

Furthermore, in the radar apparatus 1 according to this embodiment, unlike in the conventional Fourier method, values (main beam) of the direction estimation evaluation function have a sharp peak at an azimuth angle $\theta_u$ that indicates an incoming direction of a reflection wave signal reflected from a target. And sidelobes of the direction estimation evaluation function can be suppressed at azimuth angles $\theta_u$ other than the one corresponding to the incoming direction of the reflection wave signal reflected from the target.

As such, in the radar apparatus 1, sidelobes in the cross-range direction can be reduced uniformly and the target direction estimation performance can be enhanced while increase of the amount of calculation for estimation of an incoming direction of a reflection wave signal reflected from a target is suppressed.

In this embodiment, the direction estimation evaluation function calculator 23 may calculate the direction estimation evaluation function $P_{DOA}(k, m, \theta_u)$ given by Equation (16) rather than that given by Equation (14).

[Formula 16]

$$P_{DOA}(k, m, \theta_u) = F_{out}(k, m, \theta_u) \bigg/ \left\{ a(\theta_u)^H a(\theta_u) - \frac{F_{out}(k, m, \theta_u)}{Pn + P_{out}(k, m)} \right\} \quad (16)$$

Even in the case of calculating the direction estimation evaluation function $P_{DOA}(k, m, \theta_u)$ given by Equation (16), the radar apparatus 1 can likewise reduce sidelobes in the cross-range direction uniformly and enhance the target direction estimation performance while suppressing increase of the amount of calculation for estimation of an incoming direction of a reflection wave signal reflected from a target.

Furthermore, where the direction estimation evaluation function calculator 23 calculates the direction estimation evaluation function $P_{DOA}(k, m, \theta_u)$ given by Equation (16), the radar apparatus 1 can reduce sidelobes of the direction estimation evaluation function at azimuth angles $\theta_u$ other than the one corresponding to the incoming directions of the reflection wave signals reflected from targets even in the case where plural reflection wave signals arrive at the same sample time (see FIG. 8(B)).

Figure 8:
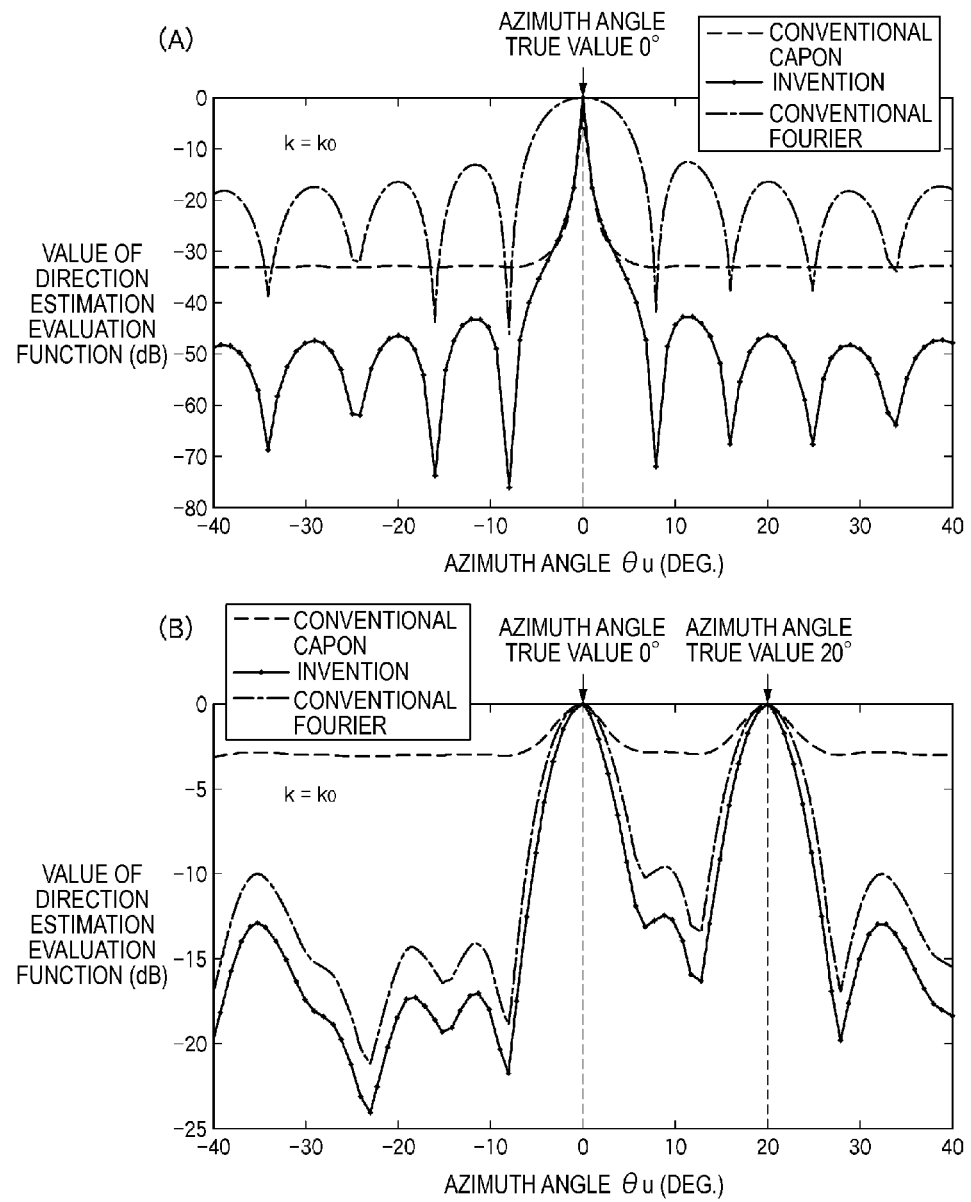
FIGS. 8(A) and 8(B) are graphs comparing other example azimuth profiles obtained by the radar apparatus according to the first embodiment and conventional radar apparatus.

FIG. 8 is graphs comparing other example azimuth profiles obtained by the radar apparatus 1 according to the first embodiment and conventional radar apparatus. FIG. 8(A) shows azimuth profiles obtained with a single target. FIG. 8(B) shows azimuth profiles obtained with two targets.

FIG. 8(A) shows, as an azimuth profile, values of the direction estimation evaluation function $P_{DOA}(k, m, \theta_u)$ in an azimuth angle $\theta_u$ range [$\theta_{min}$=−40°, $\theta_{max}$=+40°] in a case that a reflection wave signal arrives from the direction of an example azimuth angle 0° ($\theta_u$=0°) at a sample time $k_0$. The direction estimation evaluation function $P_{DOA}(k, m, \theta_u)$ is calculated according to Equation (16). For comparison, azimuth profiles obtained by the conventional Fourier method and Capon method are also shown.

In the conventional Fourier method, as in the case of FIG. 7, at the sample time $k_0$ at which a reflection wave signal reflected from a target exists, the main beam does not have a sharp peak at the azimuth angle $\theta_u$ (=0°) that indicates the incoming direction of the reflection wave signal and high-level sidelobes appear at azimuth angles $\theta_u$ other than the one corresponding to the incoming direction of the reflection wave signal. As such, in the conventional radar apparatus, it is difficult to discriminate between a main beam in an incoming direction of a reflection wave signal reflected from a target and sidelobes. Thus, the accuracy of estimation of the incoming direction of the reflection wave signal is low.

In contrast, in this embodiment, unlike in the conventional Fourier method, at the sample time $k_0$ at which a reflection wave signal reflected from a target exists, the main beam has a sharp peak at the azimuth angle $\theta_u$ (=0°) that indicates the incoming direction of the reflection wave signal and sidelobes are suppressed at azimuth angles $\theta_u$ other than the one corresponding to the incoming direction of the reflection wave signal. The azimuth profile of this embodiment is approximately on the same level as that of the conventional Capon method. As such, in the radar apparatus 1 according to this embodiment, a main beam in an incoming direction of a reflection wave signal reflected from a target can be discriminated easily from sidelobes. Thus, the accuracy of estimation of the incoming direction of the reflection wave signal can be increased.

FIG. 8(B) shows, as an azimuth profile, values of the direction estimation evaluation function $P_{DOA}(k, m, \theta_u)$ in an azimuth angle $\theta_u$ range [$\theta_{min}$=−40°, $\theta_{max}$=+40°] in a case that plural reflection wave signals arrive from the directions of example azimuth angles $\theta_u$ of 0° and 20° at a certain sample time $k_0$. The direction estimation evaluation function $P_{DOA}(k, m, \theta_u)$ is calculated according to Equation (16). For comparison, azimuth profiles obtained by the conventional Fourier method and Capon method are also shown.

In the conventional Fourier method, as in the case of FIG. 7, at the sample time $k_0$ at which reflection wave signals reflected from targets exist, the main beams do not have a sharp peak at the azimuth angles $\theta_u$ (=0°) that indicate the incoming directions of the reflection wave signals and high-level sidelobes appear at azimuth angles $\theta_u$ other than the ones corresponding to the incoming directions of the reflection wave signals. As such, in the conventional radar apparatus, it is difficult to discriminate between main beams in incoming directions of reflection wave signals reflected from targets and sidelobes. Thus, the accuracy of estimation of the incoming directions of the reflection wave signals is low.

In contrast, in this embodiment, unlike in the conventional Fourier method, at the sample time $k_0$ at which reflection wave signals reflected from targets exist, the main beams have a sharp peak at the azimuth angles $\theta_u$ (=0° and 20°) that indicate the incoming directions of the reflection wave signals and sidelobes are suppressed at azimuth angles $\theta_u$ other than the ones corresponding to the incoming directions of the reflection wave signals. The azimuth profile of this embodiment is approximately on the same level as that of the conventional Capon method. As such, in the radar apparatus 1 according to this embodiment, main beams in incoming directions of reflection wave signals reflected from targets can be discriminated easily from sidelobes. Thus, the accuracy of estimation of the incoming directions of the reflection wave signals can be increased.

In the above-described radar apparatus 1 according to this embodiment, even where the direction estimation evaluation function calculator 23 calculates the direction estimation evaluation function $P_{DOA}(k, m, \theta_u)$ given by Equation (16), given the same reference symbols as the latter and descriptions therefor will be omitted or simplified. The differences from the radar apparatus 1 will be described below.

To detect phase differences between the reception antennas of a reflection wave signal reflected from a target, the orthogonal beam multiplier 25 generates a correlation vector h(k, m) by combining addition values $Cl^1(k, m)$, $Cl^2(k, m)$, $Cl^3(k, m)$, and $Cl^4(k, m)$ which are outputs of the adders of the respective antenna system processors D1-D4 (see Equation (7)).

The orthogonal beam multiplier 25 calculates an orthogonal-beam-multiplied correlation vector $h_B(k, m)$ according to Equation (18) on the basis of the correlation vector h(k, m) and an orthogonal beam weight matrix $W_{OB}$ which is given by Equation (17). The orthogonal beam multiplier 25 outputs the orthogonal-beam-multiplied correlation vector $h_B(k, m)$ to the beam selector 26.

The orthogonal beam weight matrix $W_{OB}$ is a matrix of order Na which has such a characteristic as to satisfy Equation (19). In Equation (17), discrete Fourier transform processing is expressed in matrix form as an example. In Equation (19), I is a unit matrix.

[Formula 17]

$$W_{OB} = \begin{bmatrix} 1 & 1 & \cdots & 1 \\ 1 & \exp\left[-j\frac{2\pi(2-1)(2-1)}{Na}\right] & \cdots & \exp\left[-j\frac{2\pi(2-1)(Na-1)}{Na}\right] \\ \vdots & \vdots & \ddots & \vdots \\ 1 & \exp\left[-j\frac{2\pi(Na-1)(2-1)}{Na}\right] & \cdots & \exp\left[-j\frac{2\pi(Na-1)(Na-1)}{Na}\right] \end{bmatrix} \quad (17)$$

[Formula 18]

$$h_B(k, m) = W_{OB}^H h(k, m) \quad (18)$$

[Formula 19]

$$W_{OB} W_{OB}^H = W_{OB}^H W_{OB} = I \quad (19)$$

a high-resolution angular spectrum can be obtained while the amount of calculation of the direction estimation evaluation function can be reduced to about ⅑ (about 10%) of that of the conventional Capon method in the case where Na is equal to 4 and to about 1/34 (about 3%) in the case where Na is equal to 8.

Embodiment 2

Figure 9:
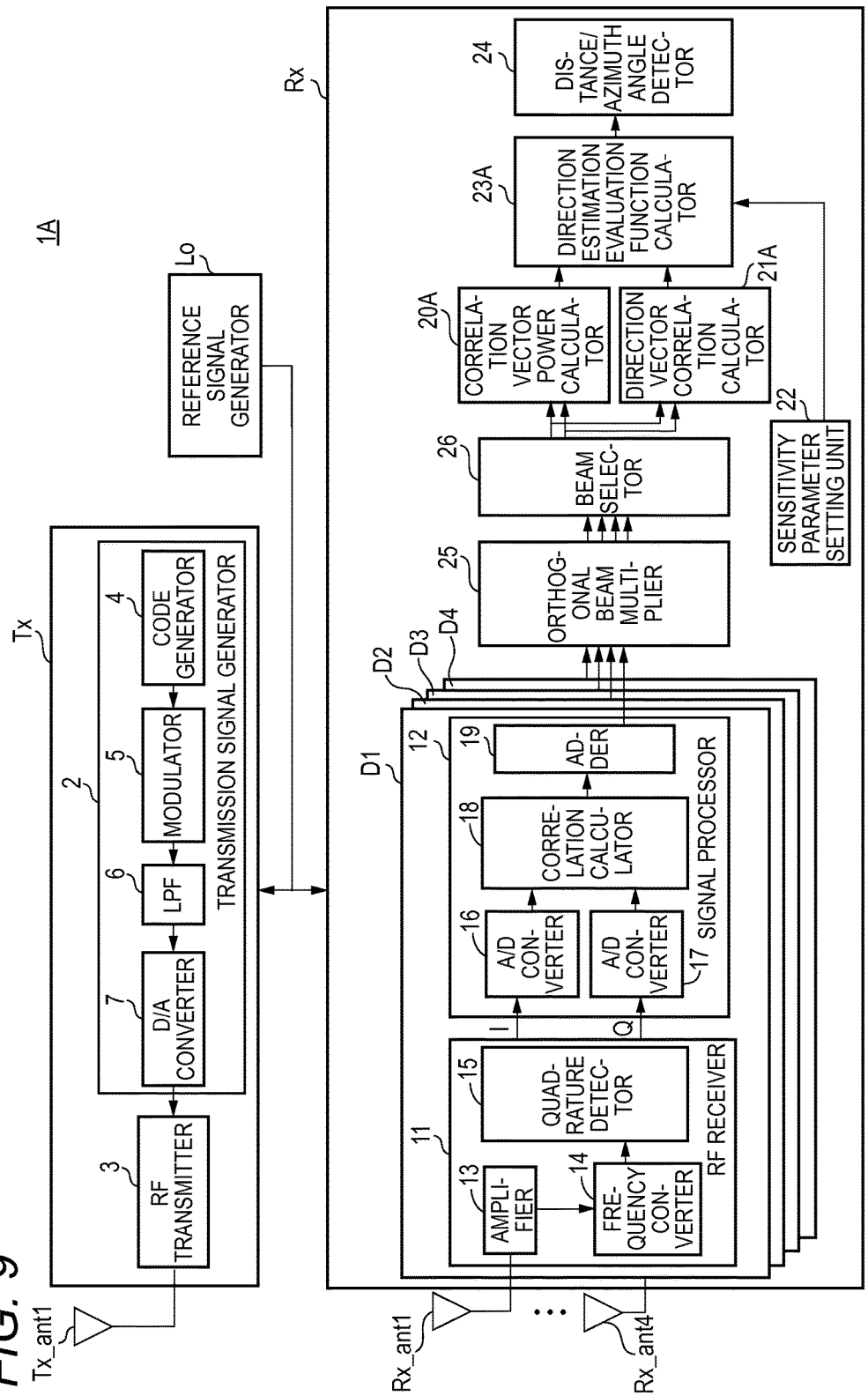
FIG. 9 is a block diagram showing the internal configuration of a radar apparatus according to a second embodiment in detail.

Next, a radar apparatus 1A according to a second embodiment will be described with reference to FIG. 9. FIG. 9 is a block diagram showing the internal configuration of the radar apparatus 1A according to the second embodiment in detail. The radar apparatus 1A includes a reference signal generator Lo, a radar transmitter Tx, and a radar receiver RxA.

The radar receiver Rx has four antenna system processors D1, D2, D3, and D4 (four is an example number), an orthogonal beam multiplier 25, a beam selector 26, a correlation vector power calculator 20A, a direction vector correlation calculator 21A, a sensitivity parameter setting unit 22, a direction estimation evaluation function calculator 23A, and a distance/azimuth angle detector 24.

Elements (and their operations) of the radar apparatus 1A according to this embodiment having the same ones in the radar apparatus 1 according to the first embodiment will be The beam selector 26 calculates absolute values or square values of the components of the orthogonal-beam-multiplied correlation vector $h_B(k, m)$ calculated by the orthogonal beam multiplier 25 and selects a maximum-value component and $N_{OB}$ components adjacent to the maximum-value component in descending order of absolute values or square values.

In the following description, a matrix including elements corresponding to the components selected in descending order by the beam selector 26 will be written as a components selected matrix $W_{sel}$. The components selected matrix $W_{sel}$ is a matrix in which the elements other than the diagonal elements are "0" and, among the diagonal elements, elements corresponding to the components selected from the orthogonal-beam-multiplied correlation vector $h_B(k, m)$ by the beam selector 26 are "1" and the other elements are "0."

Furthermore, the beam selector 26 calculates a beam selection correlation vector $h_{BS}(k, m)$ according to Equation (20) on the basis of the components selected matrix $W_{sel}$ and the orthogonal-beam-multiplied correlation vector $h_B(k, m)$ calculated by the orthogonal beam multiplier 25. The beam selector 26 outputs the beam selection correlation vector $h_{BS}(k, m)$ to the correlation vector power calculator 20A and the direction vector correlation calculator 21A. Furthermore, the beam selector 26 outputs the components selected matrix $W_{sel}$ to the direction vector correlation calculator 21A.

[Formula 20]

$$h_{BS}(k,m) = W_{sel} h_B(k,m) \qquad (20)$$

The correlation vector power calculator 20A calculates a correlation vector power $P_{out}(k, m)$ according to Equation (21) on the basis of the beam selection correlation vector $h_{BS}(k, m)$ calculated by the beam selector 26. The correlation vector power calculator 20A outputs the correlation vector power $P_{out}(k, m)$ to the direction estimation evaluation function calculator 23A.

[Formula 21]

$$P_{out}(k,m) = h_{BS}(k,m)^H h_{BS}(k,m) \qquad (21)$$

The direction vector correlation calculator 21A is stored in advance with a direction vector $a(\theta_u)$ which represents complex responses of the respective reception antennas that are produced when a reflection wave signal reflected from a target arrives from the direction of an azimuth angle $\theta_u$. The direction vector correlation calculator 21A calculates a direction vector $W_{sel} W_{OB}{}^H a(\theta_u)$ on the basis of the direction vector $a(\theta_u)$ and $W_{sel} W_{OB}{}^H$ which is the product of the components selected matrix $W_{sel}$ generated by the beam selector 26 and the orthogonal beam weight matrix $W_{OB}$.

The direction vector correlation calculator 21A calculates a direction vector correlation power $F_{out}(k, m)$ on the basis of the direction vector $a(\theta_u)$ and the beam selection correlation vector $h_{BS}(k, m)$ calculated by the beam selector 26, that is, by squaring the inner product of the direction vector $W_{sel} W_{OB}{}^H a(\theta_u)$ and the beam selection correlation vector $h_{BS}(k, m)$ (see Equation (22)). The direction vector correlation calculator 21A outputs the direction vector correlation power $F_{out}(k, m)$ to the direction estimation evaluation function calculator 23A.

[Formula 22]

$$F_{out}(k,m,\theta_u) = |[W_{sel} W_{OB}{}^H a(\theta_u)]^H h_{BS}(k,m)|^2 \qquad (22)$$

The direction estimation evaluation function calculator 23A, which serves as an evaluation function calculator, calculates a direction estimation evaluation function $P_{DOA}(k, m, \theta_u)$ to be used for estimating an incoming direction of the reflection wave signal on the basis of the outputs of the correlation vector power calculator 20A, the direction vector correlation calculator 21A, and the sensitivity parameter setting unit 22 according to Equation (23) while varying the azimuth angle $\theta_u$ for each mth output of the adder 19.

Since $[W_{sel} W_{OB}{}^H a(\theta_u)]^H W_{sel} W_{OB}{}^H a(\theta_u)$ in Equation (23) can be calculated in advance by the direction vector correlation calculator 21A, this term does not increase the amount of calculation of the direction estimation evaluation function calculator 23A. The direction estimation evaluation function calculator 23A outputs the direction estimation evaluation function $P_{DOA}(k, m, \theta_u)$ to the distance/azimuth angle detector 24.

[Formula 23]

$$P_{DOA}(k, m, \theta_u) = 1 \bigg/ \left\{ [W_{sel} W_{OB}^H a(\theta_u)]^H W_{sel} W_{OB}^H a(\theta_u) - \frac{F_{out}(k, m, \theta_u)}{P_n + P_{out}(k, m)} \right\} \qquad (23)$$

The above-described radar apparatus 1A according to this embodiment provides, in addition to the advantages of the radar apparatus 1 according to the first embodiment, an advantage that, by virtue of the use of the orthogonal beam multiplier 25 and the beam selector 26, the components of the beam selection correlation vector $h_{BS}(k, m)$ that is calculated by the beam selector 26 (see Equation (20)) and is to be used in the correlation vector power calculator 20A and the direction vector correlation calculator 21A can be reduced from those of the correlation vector $h(k, m)$ (see Equation (7)).

With this measure, in the radar apparatus 1A, the amount of calculation of a direction estimation evaluation function $P_{DOA}(k, m, \theta_u)$ in the direction estimation evaluation function calculator 23A can be reduced.

Embodiment 3

Figure 10:
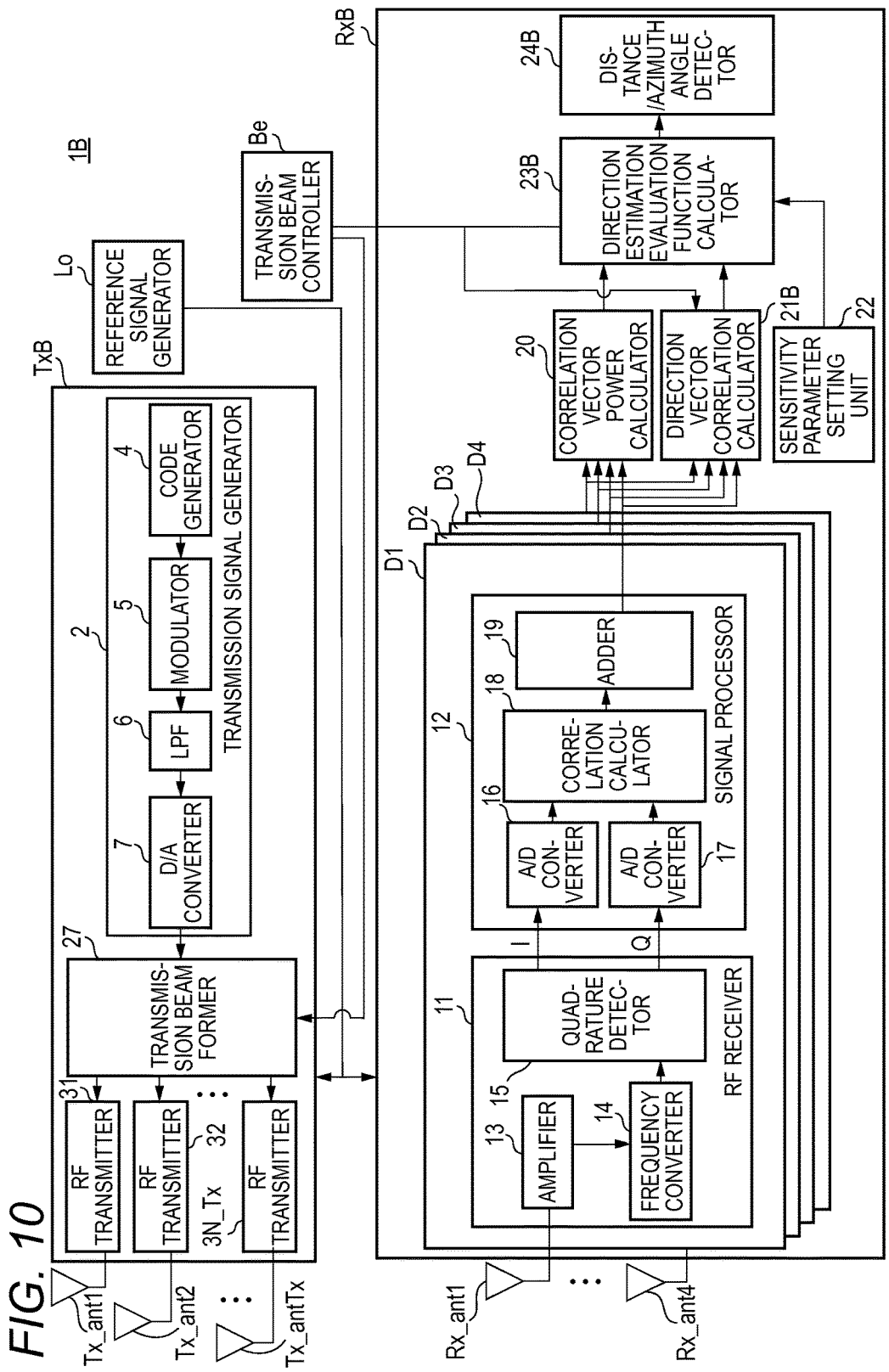
FIG. 10 is a block diagram showing the internal configuration of a radar apparatus according to a third embodiment in detail.

Next, a radar apparatus 1B according to a third embodiment will be described with reference to FIG. 10. FIG. 10 is a block diagram showing the internal configuration of the radar apparatus 1B according to the third embodiment in detail. The radar apparatus 1B includes a reference signal generator Lo, a transmission beam controller Be, a radar transmitter TxB, and a radar receiver RxB.

The radar transmitter TxB has a transmission signal generator 2, a transmission beam former 27, and a total of N_Tx RF transmitters 31, 32, . . . , 3N_Tx. Transmission antennas Tx_ant1, Tx_ant2, . . . , Tx_antN_Tx are connected to the respective RF transmitters 31, 32, . . . , 3N_Tx.

The radar receiver RxB has four antenna system processors D1, D2, D3, and D4 (four is an example number), a correlation vector power calculator 20, a direction vector correlation calculator 21B, a sensitivity parameter setting unit 22, a direction estimation evaluation function calculator 23B, and a distance/azimuth angle detector 24B.

Elements (and their operations) of the radar apparatus 1B according to this embodiment having the same ones in the radar apparatus 1 according to the first embodiment will be given the same reference symbols as the latter and descriptions therefor will be omitted or simplified. The differences from the radar apparatus 1 will be described below.

The transmission beam controller Be controls a main beam direction $\theta_{Tx}$ of a radar transmission signal that is transmitted by the radar transmitter TxB. More specifically, the transmission beam controller Be switches the main beam direction $\theta_{Tx}$ of the radar transmission signal for each set of Np transmission cycles Tr in units of $\Delta\theta_{Tx}$ in the same range as an estimation range of an incoming direction of a reflection wave signal (see FIG. 11).

Figure 11:
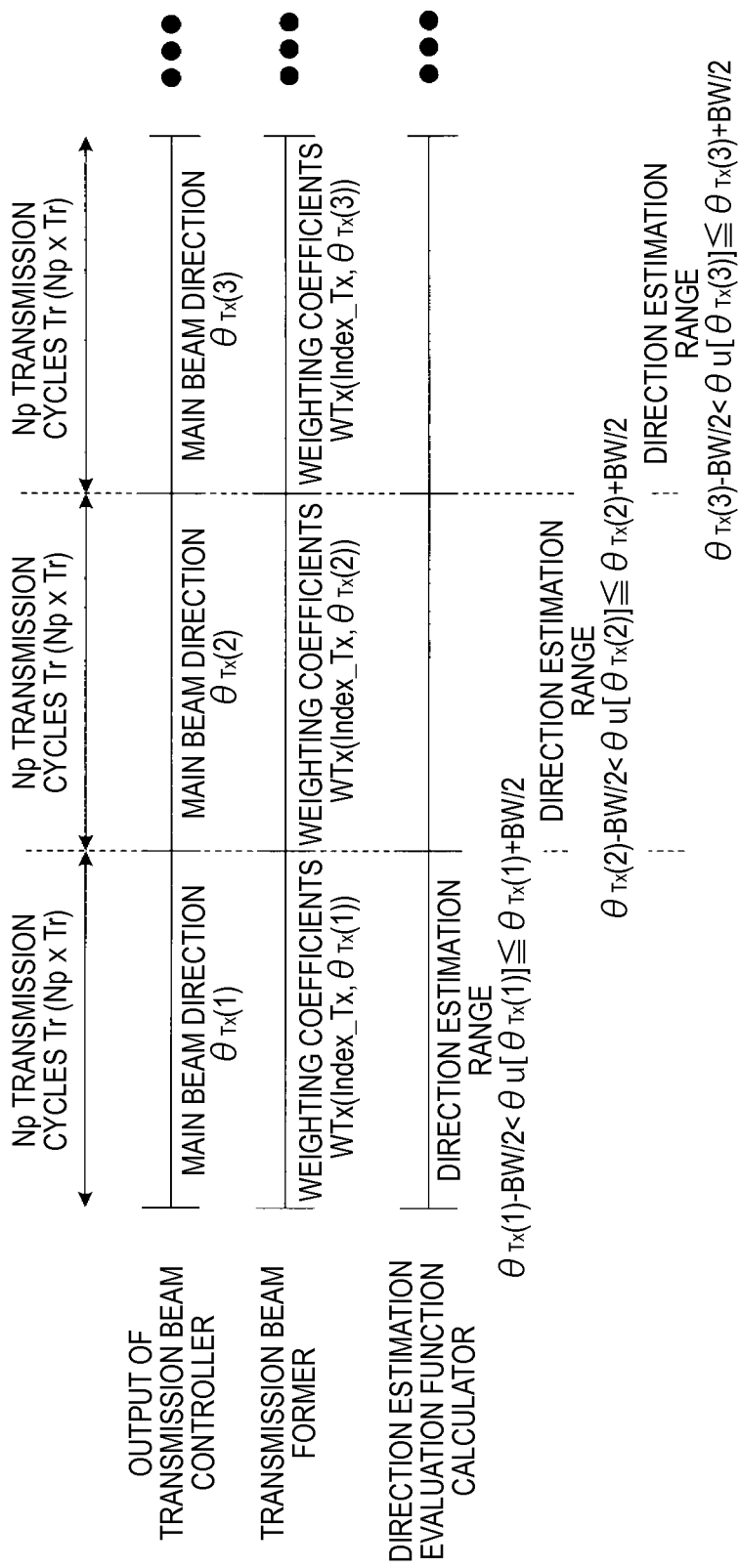
FIG. 11 shows relationships between transmission cycles and outputs of a transmission beam controller, a transmission beam former, and a direction estimation evaluation function calculator.

FIG. 11 shows relationships between transmission cycles and outputs of the transmission beam controller Be, the transmission beam former 27, and the direction estimation evaluation function calculator 23B. During the period (Np× Tr) of an mth set of Np transmission cycles Tr, the transmission beam controller Be outputs a control signal for setting the main beam direction of a radar transmission signal to $\theta_{Tx}(m)$ to the transmission beam former 27, the direction vector correlation calculator 21B, and the direction estimation evaluation function calculator 23B.

As shown in FIG. 11, during the period (Np×Tr) of a first set of Np transmission cycles Tr, the transmission beam controller Be outputs a control signal for setting the main beam direction of a radar transmission signal to $\theta_{Tx}(1)$ to the transmission beam former 27, the direction vector correlation calculator 21B, and the direction estimation evaluation function calculator 23B.

During the period (Np×Tr) of a second set of Np transmission cycles Tr, the transmission beam controller Be outputs a control signal for setting the main beam direction of a radar transmission signal to $\theta_{Tx}(2)$ to the transmission beam former 27, the direction vector correlation calculator 21B, and the direction estimation evaluation function calculator 23B.

During the period (Np×Tr) of a third set of Np transmission cycles Tr, the transmission beam controller Be outputs a control signal for setting the main beam direction of a radar transmission signal to $\theta_{Tx}(3)$ to the transmission beam former 27, the direction vector correlation calculator 21B, and the direction estimation evaluation function calculator 23B.

The transmission beam former 27 forms a transmission beam being in the main beam direction $\theta_{Tx}$ indicated by the control signal that is output from the transmission beam controller Be on the basis of a transmission signal r(k, M) that is output from the D/A converter 7.

More specifically, the transmission beam former 27 multiples the transmission signal r(k, M) that is output from the D/A converter 7 by weighting coefficients WTx(Index_Tx, $\theta_{Tx}(m)$) which are a total of N_Tx (first to N_Txth) coefficients. The weighting coefficients WTx(Index_Tx, $\theta_{Tx}(m)$) are given by Equation (24) in the case where the transmission antennas Tx_ant1 to Tx_antN are arranged at the same element interval d (see FIG. 6). Parameter λ represents the wavelength of a radar transmission signal. Although the above description is directed to the straight antenna arrangement, the invention is not limited to such a case. The concept of this embodiment is likewise applicable to cases of circular and elliptical antenna arrangements by employing weighting coefficients that are suitable for each of them.

[Formula 24]

$$WTx(\text{Index\_}Tx, \theta_{Tx}(m)) = [\exp[j2\pi((\text{Index\_}Tx) - 1)d \sin \theta_{Tx}(m)/\lambda]] \quad (24)$$

The transmission beam former 27 outputs each of a total of N_Tx transmission signals generated through the multiplication by all the N_Tx respective sets of weighting coefficients to the corresponding one, having the same ordinal number as the ordinal number of the set of weighting coefficients represented by Index_Tx, of the RF transmitters 31-3N_Tx. Parameter Index_Tx is an integer that varies from 1 to N_Tx.

As shown in FIG. 11, during the period (Np×Tr) of the first set of Np transmission cycles Tr, the transmission beam former 27 multiplies the transmission signal r(k, M) which is the output of the D/A converter 7 by the weighting coefficients WTx(Index_Tx, $\theta_{Tx}(1)$) according to the control signal that is output from the transmission beam controller Be.

During the period (Np×Tr) of the second set of Np transmission cycles Tr, the transmission beam former 27 multiplies the transmission signal r(k, M) which is the output of the D/A converter 7 by the weighting coefficients WTx(Index_Tx, $\theta_{Tx}(2)$) according to the control signal that is output from the transmission beam controller Be.

During the period (Np×Tr) of the third set of Np transmission cycles Tr, the transmission beam former 27 multiplies the transmission signal r(k, M) which is the output of the D/A converter 7 by the weighting coefficients WTx(Index_Tx, $\theta_{Tx}(3)$) according to the control signal that is output from the transmission beam controller Be.

The transmission beam former 27 may reduce sidelobes of a radar transmission signal by forming a radar transmission signal having a main beam direction $\theta_{Tx}$ using weighting coefficient including an amplitude component and a phase component. Example beam forming methods for reducing sidelobes are methods using a binomial array, a Chebyshev array, or a Talor array.

Each of the RF transmitters 31-3N_Tx generates a transmission reference signal in a carrier frequency band by multiplying a reference signal generated by the reference signal generator Lo by a prescribed number. Each of the RF transmitters 31-3N_Tx operates on the basis of the transmission reference signal.

The Index_Txth RF transmitter up-converts the baseband transmission signal generated through the multiplication by the weighting coefficients WTx(Index_Tx, $\theta_{Tx}(m)$) into a radio-frequency radar transmission signal using the transmission reference signal.

The Index_Txth RF transmitter amplifies the signal level of the radar transmission signal to a prescribed signal level, and outputs the resulting radar transmission signal to the transmission antenna connected to the Index_Txth RF transmitter. The radar transmission signal is radiated to the space from the transmission antenna connected to the Index_Txth RF transmitter. A total of N_Tx radar transmission signals that are transmitted by all the N_Tx transmission antennas are combined together spatially, whereby a radar transmission signal being in the main beam direction is formed.

The direction vector correlation calculator 21B selects an estimation range $\theta_u[\theta_{Tx}(m)]$ of an azimuth angle of a reflection wave signal incoming direction on the basis of the main beam direction $\theta_{Tx}(m)$ indicated by the control signal that is output from the transmission beam controller Be and a range BW which approximately corresponds to a transmission beam width for each set of Np transmission cycles Tr (period Np×Tr) (see Inequality (25)).

For example, the direction vector correlation calculator 21B selects, for each set of Np transmission cycles Tr, a direction vector $a(\theta_u[\theta_{Tx}(m)])$ corresponding to the azimuth angle estimation range $\theta_u[\theta_{Tx}(m)]$ selected according to the control signal that is output from the transmission beam controller Be from direction vectors $a(\theta_u)$ stored in advance.

[Formula 25]

$$\theta_{Tx}(m) - \frac{BW}{2} \le \theta_u[\theta_{Tx}(m)] \le \theta_{Tx}(m) + \frac{BW}{2} \quad (25)$$

The direction vector correlation calculator 21B calculates a direction vector correlation power $F_{out}(k, m, \theta_u[\theta_{Tx}(m)])$ on the basis of the direction vector $a(\theta_u[\theta_{Tx}(m)])$ and a correlation vector h(k, m), that is, by squaring the inner product of the direction vector $a(\theta_u[\theta_{Tx}(m)])$ and the correlation vector h(k, m) (see Equation (26)). The direction vector correlation calculator 21B outputs the direction vector correlation power $F_{out}(k, m, \theta_u[\theta_{Tx}(m)])$ to the direction estimation evaluation function calculator 23B.

[Formula 26]

$$F_{out}(k, m, \theta_u[\theta_{Tx}(m)]) = |a(\theta_u[\theta_{Tx}(m)])^H h(k, m)|^2 \quad (26)$$

The direction estimation evaluation function calculator 23B, which serves as an evaluation function calculator, selects an estimation range $\theta_u[\theta_{Tx}(m)]$ of an azimuth angle of a reflection wave signal incoming direction on the basis of the main beam direction $\theta_{Tx}(m)$ indicated by the control signal that is output from the transmission beam controller Be and the range BW which approximately corresponds to the transmission beam width for each set of Np transmission cycles Tr (period Np×Tr) (see FIG. 11 and Inequality (25)).

For example, during the period (Np×Tr) of the first Np set of transmission cycles Tr, the direction estimation evaluation function calculator 23B selects a range of [θ(1)−BW/2] to [θ(1)+BW/2] as an estimation range $\theta_u[\theta_{Tx}(1)]$ of an azimuth angle of a reflection wave signal incoming direction according to the control signal that is output from the transmission beam controller Be.

During the period (Np×Tr) of the second Np set of transmission cycles Tr, the direction estimation evaluation function calculator 23B selects a range of [θ(2)−BW/2] to [θ(2)+BW/2] as an estimation range $\theta_u[\theta_{Tx}(2)]$ of an azimuth angle of a reflection wave signal incoming direction according to the control signal that is output from the transmission beam controller Be.

During the period (Np×Tr) of the third Np set of transmission cycles Tr, the direction estimation evaluation function calculator 23B selects a range of [θ(3)−BW/2] to [θ(3)+BW/2] as an estimation range $\theta_u[\theta_{Tx}(3)]$ of an azimuth angle of a reflection wave signal incoming direction according to the control signal that is output from the transmission beam controller Be.

The direction estimation evaluation function calculator 23B calculates a direction estimation evaluation function $P_{DOA}(k, m, \theta_u[\theta_{Tx}(m)])$ on the basis of the outputs of the correlation vector power calculator 20, the direction vector correlation calculator 21B, and the sensitivity parameter setting unit 22 according to Equation (27) while variably selecting the estimation range $\theta_u[\theta_{Tx}(m)]$ of an azimuth angle of a reflection wave signal incoming direction according to Inequality (25) for each mth output of the adder 19. The direction estimation evaluation function calculator 23B outputs the direction estimation evaluation function $P_{DOA}(k, m, \theta_u[\theta_{Tx}(m)])$ to the distance/azimuth angle detector 24B.

[Formula 27]

$$P_{DOA}(k, m, \theta_u[\theta_{Tx}(m)]) = \\ 1 \Big/ \left\{ a(\theta_u[\theta_{Tx}(m)])^H a(\theta_u[\theta_{Tx}(m)]) - \frac{F_{out}(k, m, \theta_u[\theta_{Tx}(m)])}{P_n + P_{out}(k, m)} \right\} \quad (27)$$

Since $a(\theta_u[\theta_{Tx}(m)])^H a(\theta_u[\theta_{Tx}(m)])$ in Equation (27) can be calculated in advance by the direction vector correlation calculator 21B, for example, this term does not increase the amount of calculation of the direction estimation evaluation function calculator 23B.

When the switching, from $\theta_{min}$ to $\theta_{max}$, of the main beam direction $\theta_{Tx}$ of the radar transmission signal transmitted by the radar transmitter TxB has been completed, the distance/azimuth angle detector 24B, which serves as a target detector, detects a maximum value (peak value) of the direction estimation evaluation function $P_{DOA}(k, m, \theta_u[\theta_{Tx}(m)])$ given by Equation (27) for each sample time k. When a maximum value at a certain sample time k is larger than or equal to a prescribed threshold value, the distance/azimuth angle detector 24B estimates that the azimuth angle $\theta_u$ that gives the maximum value at the sample time k is an incoming direction of the reflection wave signal reflected from a target.

Furthermore, the distance/azimuth angle detector 24B estimates a distance D(k) from the measuring site of the radar apparatus 1B to the target according to Equation (15) on the basis of the sample time k at which the direction estimation evaluation function $P_{DOA}(k, m, \theta_u[\theta_{Tx}(m)])$ has the maximum value.

Where the main beam direction $\theta_{Tx}$ ($\theta_{min} \leq \theta \leq \theta_{max}$) of a radar transmission signal to be transmitted by the radar transmitter TxB should be switched from to $\theta_{max}$ repeatedly, the transmission beam controller Be output control signals for switching the main beam direction $\theta_{Tx}$ from $\theta_{min}$ to $\theta_{max}$ or from $\theta_{max}$ to $\theta_{min}$ to the transmission beam former 27, the direction vector correlation calculator 21B, and the direction estimation evaluation function calculator 23B. This also applied to each of the following embodiments.

The radar apparatus 1B according to this embodiment provides the same advantages as the radar apparatus 1 according to the first embodiment. Furthermore, in the radar apparatus 1B, the transmission beam former 27 estimates an incoming direction of a reflection wave signal on the basis of a main beam direction $\theta_{Tx}$ corresponding to a control signal that is output from the transmission beam controller Be and a range BW which approximately corresponds to a transmission beam width (see Inequality (25)).

With this measure, the radar apparatus 1B can select an estimation range of an incoming direction of a reflection wave signal using a range where a reflection wave signal reflected from a target has a largest reception SNR, whereby the error of estimation of a direction of a reflection wave signal can be reduced.

Still further, in the radar apparatus 1B, even though plural targets exist in a number that is larger than the number of reception antennas within a distance resolution of the radar apparatus 1B, since the main beam direction $\theta_{Tx}$ of a radar transmission signal is switched every set of Np transmission cycles Tr, a reflection wave signal(s) reflected from a target(s) that is outside the estimation range $\theta_u[\theta_{Tx}(m)])$ corresponding to the main beam direction $\theta_{Tx}$ of the radar transmission signal and the transmission beam width BW can be suppressed.

As a result, in the radar apparatus 1B, the probability can be increased that reflection wave signals reflected from targets that are inside the direction estimation range $\theta_u[\theta_{Tx}(m)])$ corresponding to the main beam direction $\theta_{Tx}$ of a radar transmission signal and the transmission beam width BW and exist within the distance resolution are ones reflected from targets that are smaller in number than the reception antennas. This makes it possible to detect one or plural targets existing in the transmission beam with at a high resolution with high accuracy.

Embodiment 4

Figure 12:
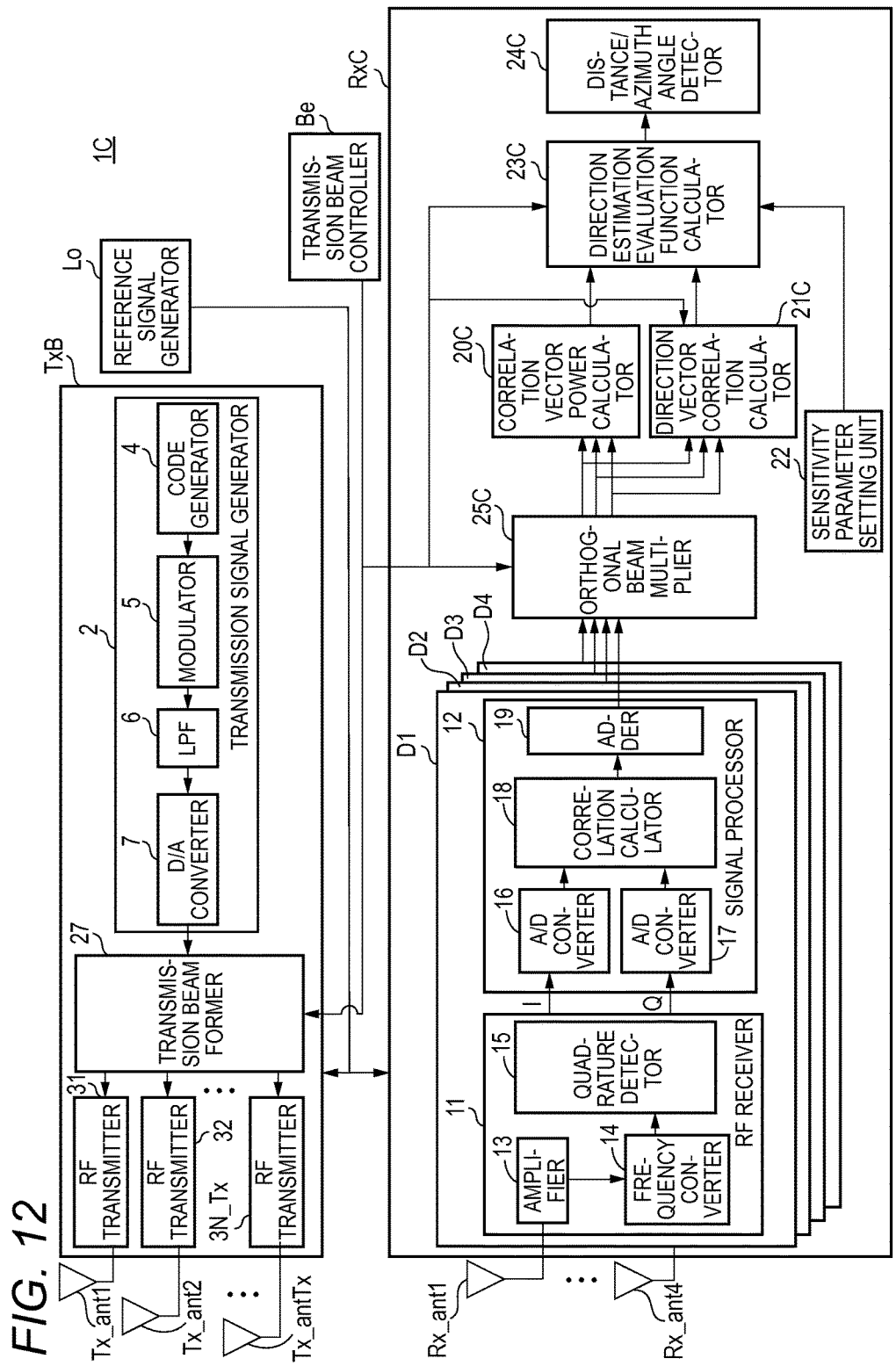
FIG. 12 is a block diagram showing the internal configuration of a radar apparatus according to a fourth embodiment in detail.

Next, a radar apparatus 1C according to a fourth embodiment will be described with reference to FIG. 12. FIG. 12 is a block diagram showing the internal configuration of the radar apparatus 1C according to the fourth embodiment in detail. The radar apparatus 1C includes a reference signal generator Lo, a transmission beam controller Be, a radar transmitter TxB, and a radar receiver RxC.

The radar receiver RxC has four antenna system processors D1, D2, D3, and D4 (four is an example number), an orthogonal beam multiplier 25C, a correlation vector power calculator 20C, a direction vector correlation calculator 21C, a sensitivity parameter setting unit 22, a direction estimation evaluation function calculator 23C, and a distance/azimuth angle detector 24C.

Elements (and their operations) of the radar apparatus 1C according to this embodiment having the same ones in the radar apparatus 1B according to the third embodiment will be given the same reference symbols as the latter and descriptions therefor will be omitted or simplified. The differences from the radar apparatus 1B will be described below.

In this embodiment, during the period (Np×Tr) of each set of Np transmission cycles Tr, the transmission beam controller Be outputs a control signal for setting the main beam direction of a radar transmission signal to $\theta_{Tx}(m)$ to the transmission beam former 27, the orthogonal beam multiplier 25C, the direction vector correlation calculator 21C, and the direction estimation evaluation function calculator 23C.

Figure 13:
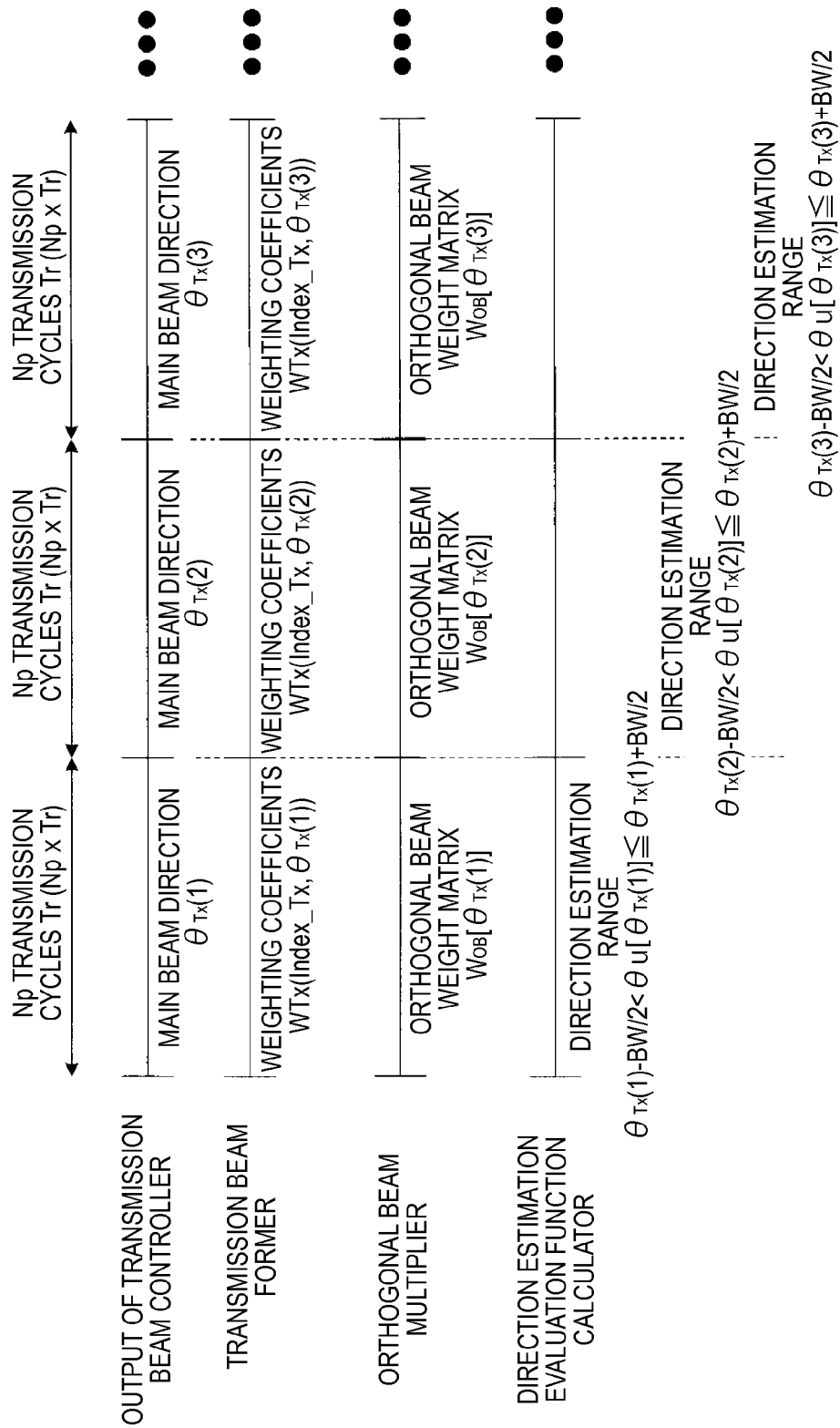
FIG. 13 shows relationships between transmission cycles and outputs of a transmission beam controller, a transmission beam former, an orthogonal beam multiplier, and a direction estimation evaluation function calculator.

As shown in FIG. 13, the orthogonal beam multiplier 25C generates an orthogonal beam weight matrix $W_{OB}[\theta_{Tx}(m)]$ which is given by Equation (28) for each set of Np transmission cycles Tr (period Np×Tr) according to the control signal that is output from the transmission beam controller Be. FIG. 13 shows relationships between transmission cycles and outputs of the transmission beam controller Be, the transmission beam former 27, the orthogonal beam multiplier 25C, and the direction estimation evaluation function calculator 23C.

As shown in FIG. 13, during the period (Np×Tr) of a first set of Np transmission cycles Tr, the orthogonal beam multiplier 25C generates an orthogonal beam weight matrix $W_{OB}[\theta_{Tx}(1)]$ according to the control signal that is output from the transmission beam controller Be.

During the period (Np×Tr) of a second set of Np transmission cycles Tr, the orthogonal beam multiplier 25C generates an orthogonal beam weight matrix $W_{OB}[\theta_{Tx}(2)]$ according to the control signal that is output from the transmission beam controller Be.

During the period (Np×Tr) of a third set of Np transmission cycles Tr, the orthogonal beam multiplier 25C generates an orthogonal beam weight matrix $W_{OB}[\theta_{Tx}(3)]$ according to the control signal that is output from the transmission beam controller Be.

The orthogonal beam multiplier 25C calculates an orthogonal-beam-multiplied correlation vector $h_B(k, m)$ according to Equation (29) on the basis of a correlation vector $h(k, m)$ and an orthogonal beam weight matrix $W_{OB}[\theta_{Tx}(m)]$ generated during the period (Np×Tr) of an mth set of Np transmission cycles Tr. The orthogonal beam multiplier 25C outputs the orthogonal-beam-multiplied correlation vector $h_B(k, m)$ to the correlation vector power calculator 20C and the direction vector correlation calculator 21C.

The orthogonal beam weight matrix $W_{OB}[\theta_{Tx}(m)]$ is used for forming a transmission beam being in the same direction as a main beam direction $\theta_{Tx}(m)$ indicated by the control signal that is output from the transmission beam controller Be and an orthogonal beam that is adjacent to the transmission beam. For example, where 3-direction orthogonal beam weights are used, the orthogonal beam weight matrix $W_{OB}[\theta_{Tx}(m)]$ is given by Equation (28).

[Formula 28]

$$W_{OR}[\theta_{Tx}(m)] = \begin{bmatrix} 1 & 1 & 1 \\ \exp\left[-j\frac{2\pi\{2-1-\text{shift}(\theta_{Tx})\}(2-1)}{N_a}\right] & \exp\left[-j\frac{2\pi\{-\text{shift}(\theta_{Tx})\}(2-1)}{N_a}\right] & \exp\left[-j\frac{2\pi\{N_a-1-\text{shift}(\theta_{Tx})\}(2-1)}{N_a}\right] \\ \vdots & \vdots & \vdots \\ \exp\left[-j\frac{2\pi\{2-1-\text{shift}(\theta_{Tx})\}(N_a-1)}{N_a}\right] & \exp\left[-j\frac{2\pi\{-\text{shift}(\theta_{Tx})\}(N_a-1)}{N_a}\right] & \exp\left[-j\frac{2\pi\{N_a-1-\text{shift}(\theta_{Tx})\}(N_a-1)}{N_a}\right] \end{bmatrix}$$
(28)

[Formula 29]

$$h_B(k, m) = W_{OB}[\theta_{Tx}(m)]^H h(k, m) \tag{29}$$

The correlation vector power calculator 20C calculates a correlation vector power $P_{out}(k, m)$ according to Equation (30) on the basis of the orthogonal-beam-multiplied correlation vector $h_B(k, m)$ calculated by the orthogonal beam multiplier 25C. The correlation vector power calculator 20C outputs the correlation vector power $P_{out}(k, m)$ to the direction estimation evaluation function calculator 23C.

[Formula 30]

$$P_{out}(k,m) = h_B(k,m)^H h_B(k,m) \tag{30}$$

The direction vector correlation calculator 21C generates, for each set of Np transmission cycles Tr, a direction vector $W_{OB}[\theta_{Tx}(m)]^H a(\theta_u)$ corresponding to an azimuth angle estimation range $\theta_u[\theta_{Tx}(m)]$ selected according to the control signal that is output from the transmission beam controller Be from direction vectors $a(\theta_u)$ stored in advance.

The direction vector correlation calculator 21C calculates a direction vector correlation power $F_{out}(k, m, \theta_u[\theta_{Tx}(m)])$ on the basis of the direction vector $W_{OB}[\theta_{Tx}(m)]^H a(\theta_u)$ and the correlation vector $h_B(k, m)$, that is, by squaring the inner product of the direction vector $W_{OB}[\theta_{Tx}(m)]^H a(\theta_u)$ and the beam selection correlation vector $h_B(k, m)$ (see Equation (31)). The direction vector correlation calculator 21C outputs the direction vector correlation power $F_{out}(k, m, \theta_u[\theta_{Tx}(m)])$ to the direction estimation evaluation function calculator 23C.

[Formula 31]

$$F_{out}(k,m,\theta_u[\theta_{Tx}(m)]) = |[W_{OB}[\theta_{Tx}(m)]^H a(\theta_u)]^H h_B(k,m)|^2 \tag{31}$$

The direction estimation evaluation function calculator 23C, which serves as an evaluation function calculator, calculates a direction estimation evaluation function $P_{DOA}(k, m, \theta_u[\theta_{Tx}(m)])$ on the basis of the outputs of the correlation vector power calculator 20C, the direction vector correlation calculator 21C, and the sensitivity parameter setting unit 22 according to Equation (32) while variably selecting an estimation range $\theta_u[\theta_{Tx}(m)]$ of an azimuth angle of a reflection wave incoming direction according to Inequality (25) for each mth output of the adder 19. The direction estimation evaluation function calculator 23C outputs the direction estimation evaluation function $P_{DOA}(k, m, \theta_u[\theta_{Tx}(m)])$ to the distance/azimuth angle detector 24C.

[Formula 32]

$$P_{DOA}(k, m, \theta_u[\theta_{Tx}(m)]) = \\ 1 \Big/ \Big\{ [W_{sel}W_{OB}^H a(\theta_u)]^H W_{sel}W_{OB}^H a(\theta_u) - \frac{F_{out}(k, m, \theta_u[\theta_{Tx}(m)])}{Pn + P_{out}(k, m)} \Big\} \quad (32)$$

Since $[W_{sel}W_{OB}{}^H a(\theta_u)]^H W_{sel}W_{OB}{}^H a(\theta_u)$ in Equation (32) can be calculated in advance by the direction vector correlation calculator 21C, this term does not increase the amount of calculation of the direction estimation evaluation function calculator 23C.

When the switching, from to $\theta_{max}$, of the main beam direction $\theta_{Tx}$ of the radar transmission signal transmitted by the radar transmitter TxB has been completed, the distance/azimuth angle detector 24C, which serves as a target detector, detects a maximum value (peak value) of the direction estimation evaluation function $P_{DOA}(k, m, \theta_u[\theta_{Tx}(m)])$ given by Equation (32) for each sample time k. When a maximum value at a certain sample time k is larger than or equal to a prescribed threshold value, the distance/azimuth angle detector 24C estimates that the azimuth angle $\theta_u$ that gives the maximum value at the sample time k is an incoming direction of the reflection wave signal reflected from a target.

Furthermore, the distance/azimuth angle detector 24C estimates a distance D(k) from the measuring site of the radar apparatus 1C to the target according to Equation (15) on the basis of the sample time k at which the direction estimation evaluation function $P_{DOA}(k, m, \theta_u[\theta_{Tx}(m)])$ has the maximum value.

The above-described radar apparatus 1C according to this embodiment provides, in addition to the advantages of the radar apparatus 1B according to the third embodiment, an advantage that, by virtue of the use of the orthogonal beam multiplier 25C, the components of the beam selection correlation vector $h_B(k, m)$ that is calculated by the orthogonal beam multiplier 25C (see Equation (29)) and is to be used in the correlation vector power calculator 20C and the direction vector correlation calculator 21C can be reduced from those of the correlation vector h(k, m) (see Equation (7)).

With this measure, in the radar apparatus 1C, the amount of calculation of a direction estimation evaluation function $P_{DOA}(k, m, \theta_u)$ in the direction estimation evaluation function calculator 23C can be reduced.

Modifications of Respective Embodiments

Whereas in each of the above-described embodiments the signal processor of each of the antenna system processors D1-D4 has the adder, it may have a Fourier transformer and a peak frequency selector instead of the adder (see FIGS. 14-17). Such modifications of the respective embodiments will be described below using a radar apparatus 1D shown in FIG. 14 as an example. Radar apparatus 1E, 1F, and 1G shown in FIGS. 15, 16, and 17, respectively, are similar modifications.

Figure 14:
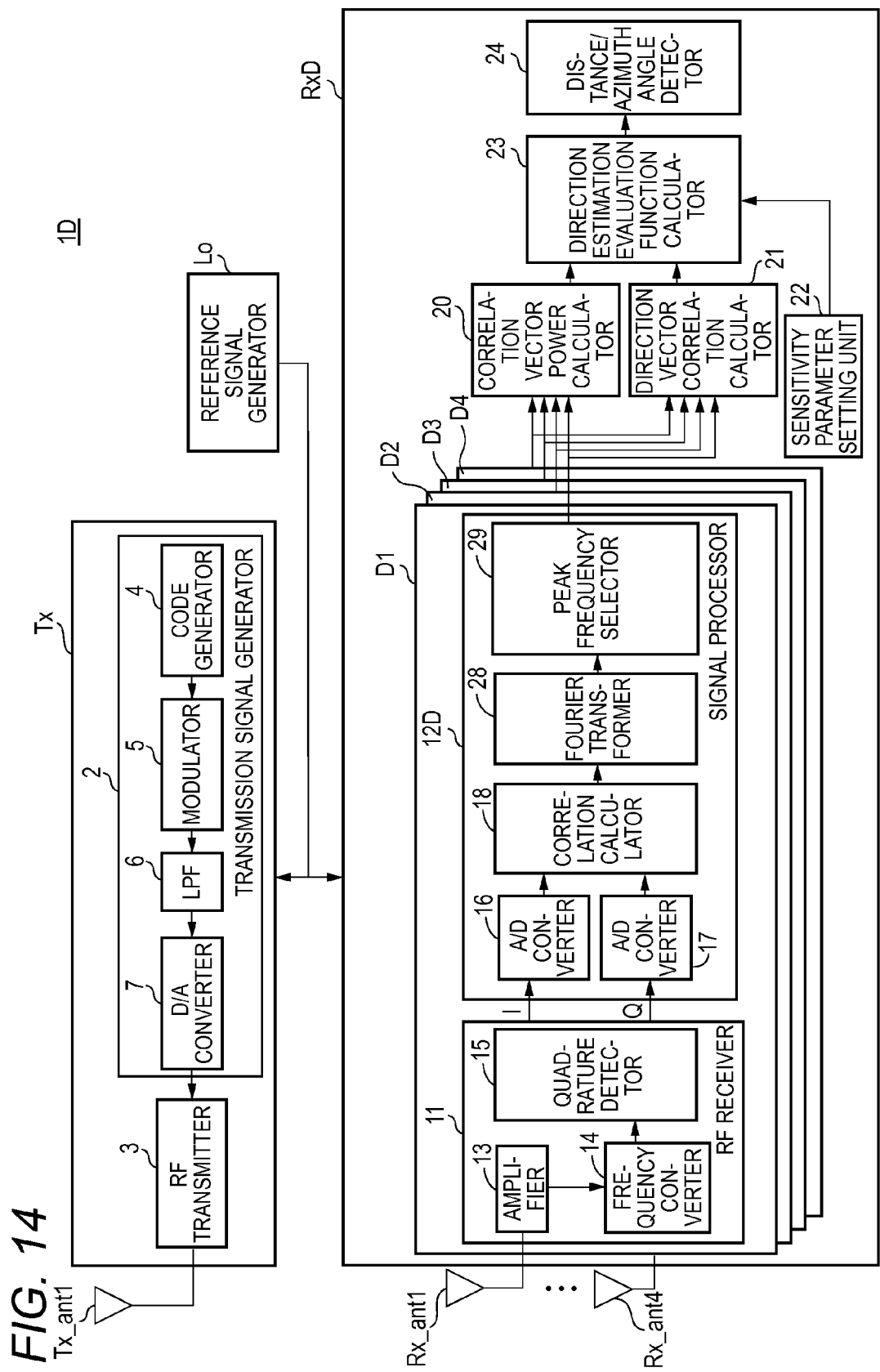
FIG. 14 is a block diagram showing the internal configuration of a radar apparatus according to a modification of the first embodiment in detail.
Figure 15:
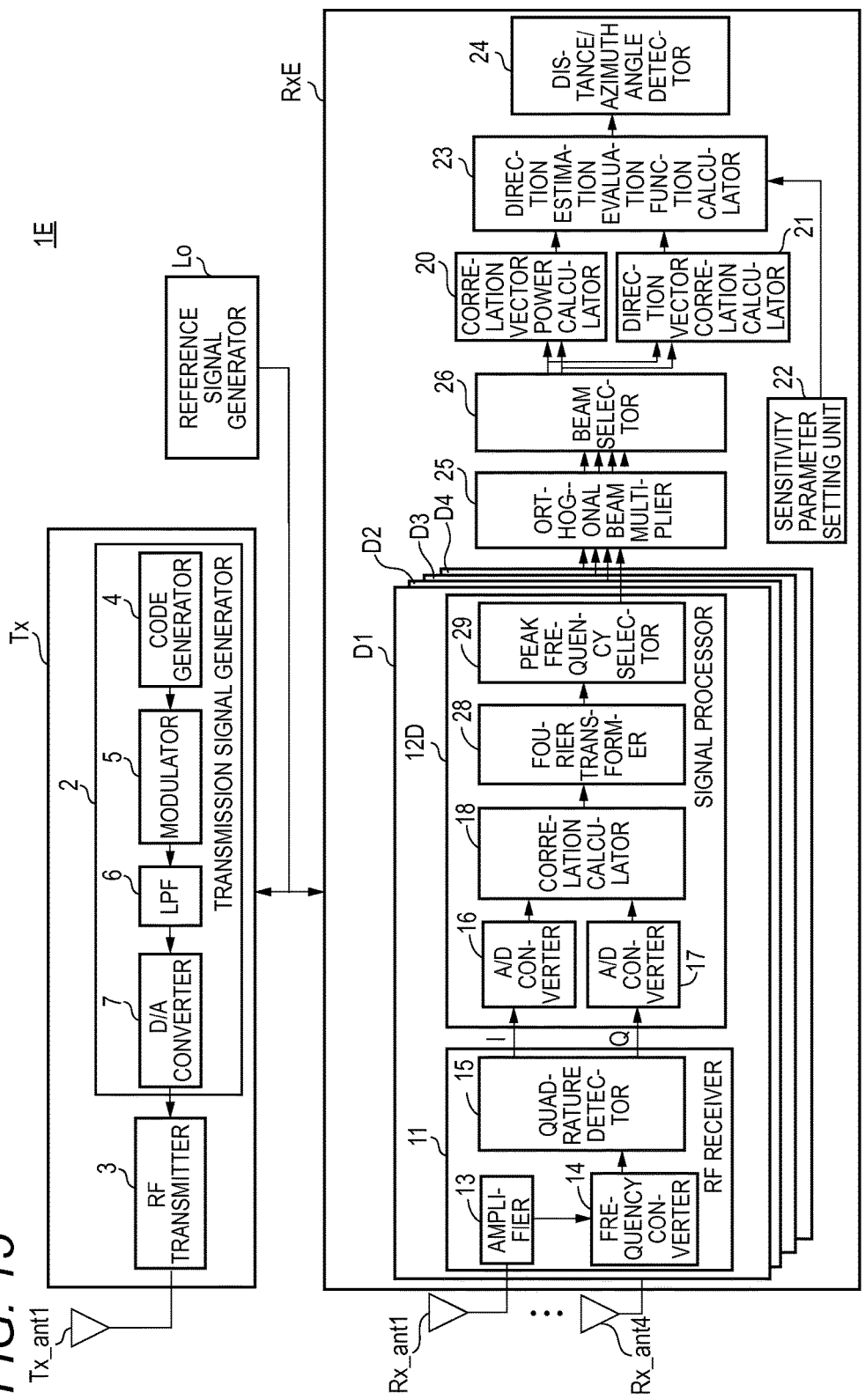
FIG. 15 is a block diagram showing the internal configuration of a radar apparatus according to a modification of the second embodiment in detail.
Figure 16:
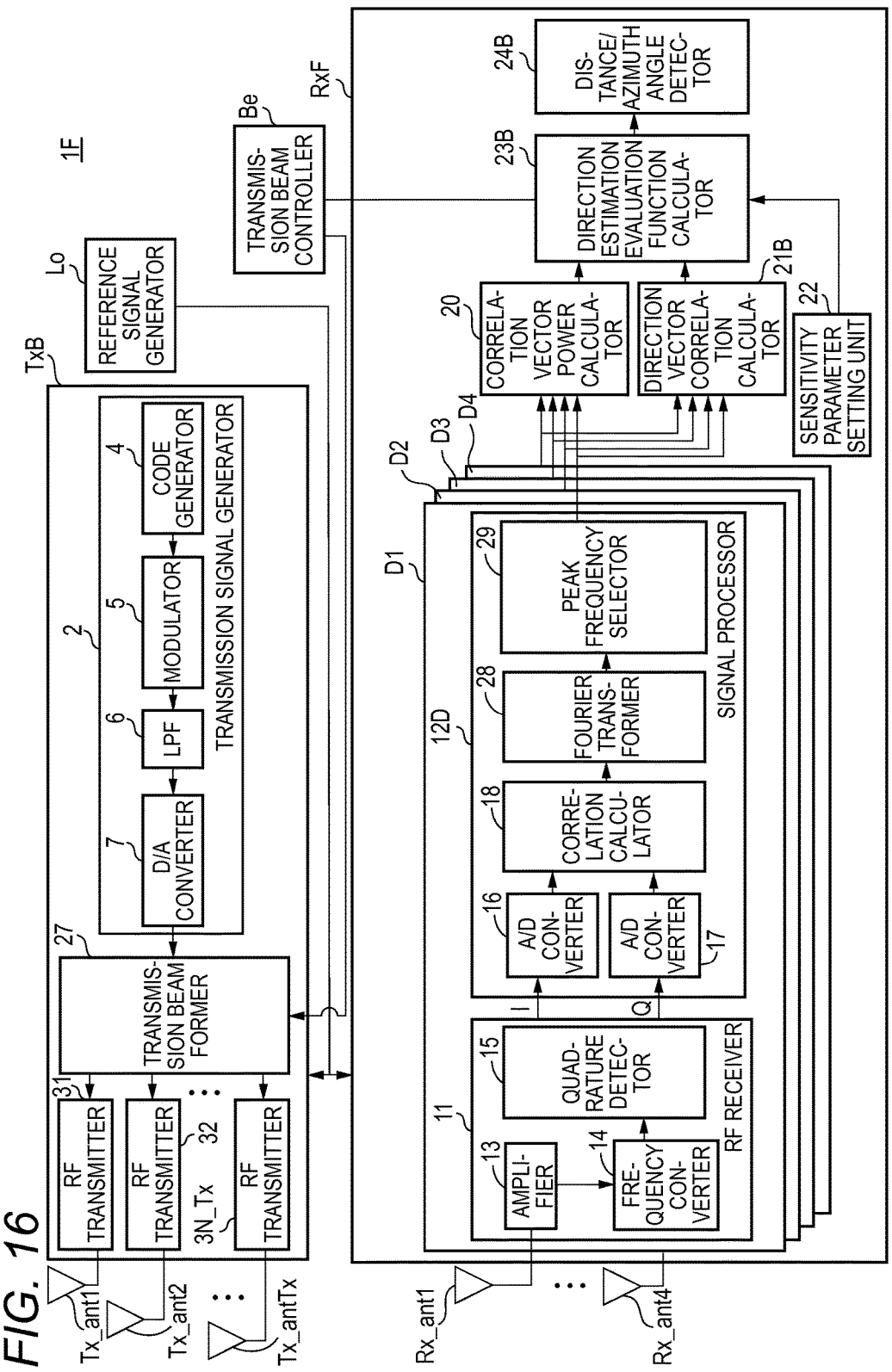
FIG. 16 is a block diagram showing the internal configuration of a radar apparatus according to a modification of the third embodiment in detail.
Figure 17:
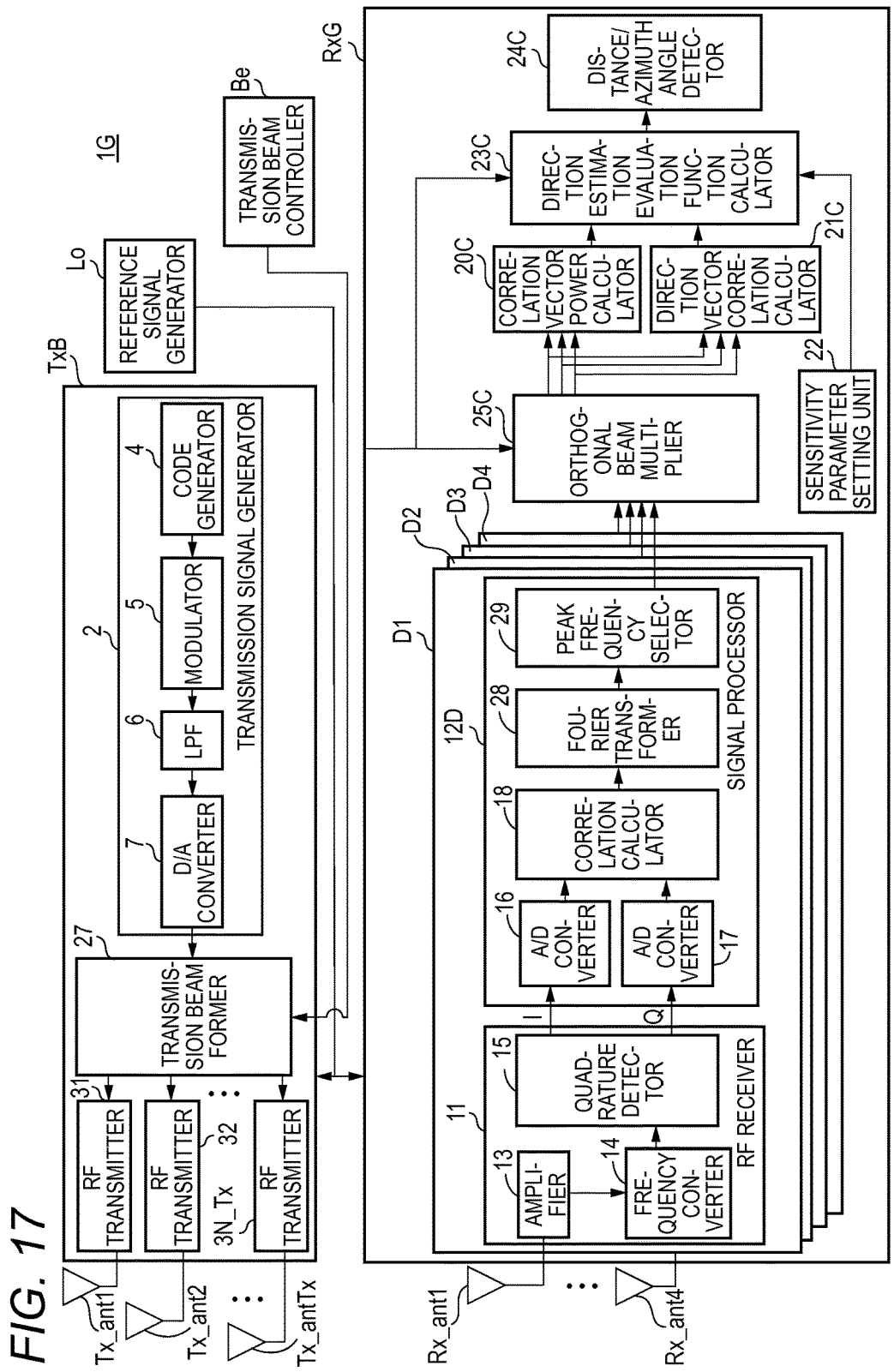
FIG. 17 is a block diagram showing the internal configuration of a radar apparatus according to a modification of the fourth embodiment in detail.

FIG. 14 is a block diagram showing the internal configuration of the radar apparatus 1D according to the modification of the first embodiment in detail. FIG. 15 is a block diagram showing the internal configuration of the radar apparatus 1E according to the modification of the second embodiment in detail. FIG. 16 is a block diagram showing the internal configuration of the radar apparatus 1F according to the modification of the third embodiment in detail. FIG. 17 is a block diagram showing the internal configuration of the radar apparatus 1G according to the modification of the fourth embodiment in detail.

In the radar apparatus 1D shown in FIG. 14, a signal processor 12D of the antenna system processor D1, for example, has two A/D converters 16 and 17, a correlation calculator 18, a Fourier transformer 28, and a peak frequency selector 29. Elements (and their operations) of the radar apparatus 1D according to the modification of the first embodiment having the same ones in the radar apparatus 1 according to the first embodiment will be given the same reference symbols as the latter and descriptions therefor will be omitted or simplified. The differences from the radar apparatus 1 will be described below.

The Fourier transformer 28 performs discrete Fourier transform processing or fast Fourier transform processing by performing window function processing for each sample time k of each transmission cycle Tr on the basis of a total of Np sliding correlation values AC(k, M) that have been calculated for each sample time k in Np transmission cycles $T_r$.

More specifically, the Fourier transformer 28 calculates Doppler frequency components of a total of Np sliding correlation values AC(k, M) by performing discrete Fourier transform processing or fast Fourier transform processing by performing window function processing for each set of sliding correlation values AC(k, Np(m−1)+1) to AC(k, Np×m) that have been calculated in the prescribed number (Np) of transmission cycles $T_r$. The Fourier transformer 28 outputs the Doppler frequency components of the sliding correlation values AC(k, Np(m−1)+1) to AC(k, Np×m) that have been calculated in the prescribed number (Np) of transmission cycles $T_r$ (period Np×$T_r$) to the peak frequency selector 29.

The peak frequency selector 29 outputs a sliding correlation value (complex value) corresponding to a peak-value Doppler frequency in the Doppler frequency components calculated by the Fourier transformer 28 to the correlation vector power calculator 20 and the direction vector correlation calculator 21 as an output Cl(k, m) of the adder 19. The subsequent operation is the same as in the radar apparatus 1 according to the first embodiment and hence will not be described.

With the above measure, in each of the radar apparatus 1D, 1E, 1F, and 1G, when Doppler frequency components of sliding correlation values AC(k, Np(m−1)+1) to AC(k, Np×m) that have been calculated in the prescribed number (Np) of transmission cycles $T_r$ (period Np×$T_r$) have plural peak values, sliding correlation values corresponding to the peak-value Doppler frequencies determined from an output of the Fourier transformer 28 can be used as values Cl(k, m).

As a result, in each of the radar apparatus 1D, 1E, 1F, and 1G, when plural targets existing in a distance resolution of each of the radar apparatus 1D, 1E, 1F, and 1G are moving at different speeds, peak-value Doppler frequencies can be detected (extracted) from Doppler frequency components of sliding correlation values. This makes it possible to increase the estimation accuracy of distances and directions of plural targets.

Although the various embodiments have been described above with reference to the drawings, it goes without saying that this disclosure is not limited to those examples. It is apparent that those skilled in the art would conceive various changes or modifications within the scopes of the claims.

And such changes or modifications should naturally be construed as being included in the technical scope of the disclosure.

A radio-frequency radar transmission signal transmitted by the radar apparatus according to each of the above embodiments is not limited to a pulse wave as used in pulse compression radar apparatus and may be a continuous wave as used in FM-CW radar apparatus, for example.

In the above-described first embodiment, the direction estimation evaluation function calculator 23 may calculate a direction estimation evaluation function $P_{DOA}(k, m, \theta_u)$ according to, for example, Formula (33) instead of Equation (14) or (16).

In Formula (33), α is a prescribed value which is a positive real number that is smaller than or equal to 1. A direction estimation evaluation function $P_{DOA}(k, m, \theta_u)$ for an incoming wave is calculated in the following manner. When the ratio of the direction vector correlation power $F_{out}(k, m, \theta_u)$ to the correlation vector power $P_{out}(k, m)$ is larger than or equal to (prescribed value α)×$a(\theta_u)^H a(\theta_u)$, the direction estimation evaluation function calculator 23 judges that presence of an incoming wave in the azimuth angle $\theta_u$ at the sample time k is probable and calculates a direction estimation evaluation function using the equation on the third row of Formula (33).

On the other hand, when the ratio of the direction vector correlation power $F_{out}(k, m, \theta_u)$ to the correlation vector power $P_{out}(k, m)$ is smaller than (prescribed value α)×$a(\theta_u)^H a(\theta_u)$, the direction estimation evaluation function calculator 23 judges that presence of an incoming wave in the azimuth angle $\theta_u$ at the sample time k is not probable and calculates a direction estimation evaluation function using the equation on the fifth row of Formula (33). Parameter $P_{noise}$ is a prescribed value approximately equal to or smaller than a noise level.

Where the direction estimation evaluation function calculator 23 uses Formula (33), it provides, in addition to the advantages obtained with Equation (16), an advantage that the equation on the fifth row of Formula (33) can be used for azimuth angles corresponding to sidelobes and hence the sidelobes can be reduced further.

[Formula 33]

$$\text{if } F_{out}(k, m, \theta_u)/a^H(\theta)a(\theta) \geq \alpha P_{out}(k, m) \quad (33)$$
$$\text{then}$$
$$P_{DOA}(k, m, \theta_u) = \frac{1-\alpha}{a^H(\theta)a(\theta) - \frac{F_{out}(k, m, \theta_u)}{Pn + P_{out}(k, m)}} F_{out}(k, m, \theta_u)$$
$$\text{else}$$
$$P_{DOA}(k, m, \theta_u) = P_{noise}$$

The present application is based on Japanese Patent Application No. 2013-033650 filed on Feb. 22, 2013, the disclosure of which is incorporated in this application by reference.

INDUSTRIAL APPLICABILITY

This disclosure is useful as radar apparatus which can reduce sidelobes in the cross-range direction while suppressing increase of the amount of calculation for estimation of a signal incoming direction while.

DESCRIPTION OF SYMBOLS 1, 1A, 1B, 1C, 1D, 1E, 1F, 1G: Radar apparatus
2: Transmission signal generator
3, 31, 32: RF transmitter
4: Code generator
5: Modulator
6: LPF
7: D/A converter
8, 14: Frequency converter
9, 13: Amplifier
11: RF receiver
12, 12D: Signal processor
15: Quadrature detector
16, 17: A/D converter
18: Correlation calculator
19: Adder
20: Correlation vector power calculator
21, 21B: Direction vector correlation calculator
22: Sensitivity parameter setting unit
23: Direction estimation evaluation function calculator
24: Distance/azimuth angle detector
25, 25C: Orthogonal beam multiplier
26: Beam selector
27: Transmission beam former
28: Fourier transformer
29: Peak frequency selector
Be: Transmission beam controller
D1, D2, D3, D4: Antenna system processor
Lo: Reference signal generator
Rx, RxA, RxB, RxC, RxD, RxE, RxF, RxG: Radar receiver
Tx, TxB: Radar receiver

The invention claimed is:

1. A radar apparatus comprising:
a radar transmitter configured to convert a transmission signal into a radio-frequency radar transmission signal and transmit the radar transmission signal from a transmission antenna; and
a radar receiver including plural antenna system processors configured to respectively receive reflection wave signals with plural respective reception antennas, the reflection wave signals being the radar transmission signal reflected by a target,
wherein the radar receiver is configured to:
calculate a correlation vector between the transmission signal and the reflection wave signals,
calculate a correlation vector power on a basis of the correlation vector,
calculate a direction vector correlation power on a basis of the correlation vector and a predetermined direction vector including amplitude and phase difference information,
calculate an evaluation function on a basis of a ratio of the direction vector correlation power to the correlation vector power, and a sensitivity parameter set based on phase differences between signals received by the plural respective reception antennas, and
estimate an azimuth angle of an incoming direction of the reflection wave signals on a basis of the correlation vector power, the direction vector correlation power, and the evaluation function.

2. The radar apparatus according to claim 1, wherein the radar receiver is configured to estimate a distance from the radar apparatus to the target.

3. The radar apparatus according to claim 1, wherein the radar receiver is configured to output an evaluation function value that increases as a ratio of the direction vector correlation power to the correlation vector power comes closer to a prescribed value.

4. The radar apparatus according to claim 1, wherein the radar receiver is configured to calculate another evaluation function obtained by multiplying the evaluation function by the direction vector correlation power.

5. The radar apparatus according to claim 1, wherein the radar receiver is configured to:
   calculate an orthogonal-beam-multiplied correlation vector on a basis of the correlation vector and a prescribed orthogonal beam weight matrix, and
   select a maximum-value component of the orthogonal-beam-multiplied correlation vector and a prescribed number of components adjacent to the maximum-value component.

6. The radar apparatus according to claim 1, further comprising:
   a transmission beam controller configured to switch a main beam direction of the radar transmission signal for each prescribed number of transmission cycles,
   wherein the radar transmitter transmits the radar transmission signal whose main beam direction is switched on a basis of a control signal that is output from the transmission beam controller.

7. The radar apparatus according to claim 6, wherein the radar receiver is configured to:
   select, as a range of calculation of the direction vector correlation power, a range that is approximately equal to a transmission beam width of the radar transmission signal and is centered by the main beam direction of the radar transmission signal indicated by the control signal that is output from the transmission beam controller, and
   select, as a range of calculation of the evaluation function, the range that is approximately equal to the transmission beam width of the radar transmission signal and is centered by the main beam direction of the radar transmission signal indicated by the control signal that is output from the transmission beam controller.

8. The radar apparatus according to claim 6, wherein the radar receiver is configured to:
   calculate an orthogonal-beam-multiplied correlation vector on a basis of the correlation vector and an orthogonal beam weight matrix corresponding to the main beam direction of the radar transmission signal indicated by the control signal that is output from the transmission beam controller,
   select, as a range of calculation of the direction vector correlation power, a range that is approximately equal to a transmission beam width of the radar transmission signal and is centered by the main beam direction of the radar transmission signal indicated by the control signal that is output from the transmission beam controller, and
   select, as a range of calculation of the evaluation function, the range that is approximately equal to the transmission beam width of the radar transmission signal and is centered by the main beam direction of the radar transmission signal indicated by the control signal that is output from the transmission beam controller.

9. The radar apparatus according to claim 1, wherein each of the plural antenna system processors is configured to:
   calculate a correlation value between the radar transmission signal and the reflection wave signal received by the reception antenna for each transmission cycle of the radar transmission signal, and
   add together correlation values in a prescribed number of transmission cycles.

10. The radar apparatus according to claim 1, wherein each of the plural antenna system processors is configured to:
    calculate a correlation value between the radar transmission signal and the reflection wave signal received by the reception antenna for each transmission cycle of the radar transmission signal,
    frequency-convert the correlation values in a prescribed number of transmission cycles into Doppler frequency components, and
    select a frequency component that gives a peak among the Doppler frequency components.

* * * * *